(12) United States Patent
Cargnoni et al.

(10) Patent No.: US 8,429,382 B2
(45) Date of Patent: Apr. 23, 2013

(54) INFORMATION HANDLING SYSTEM INCLUDING A MULTIPLE COMPUTE ELEMENT PROCESSOR WITH DISTRIBUTED DATA ON-RAMP DATA-OFF RAMP TOPOLOGY

(75) Inventors: Robert Alan Cargnoni, Austin, TX (US); Gary Alan Gorman, Austin, TX (US); Charles Francis Marino, Round Rock, TX (US); Julie Ann Rosser, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1086 days.

(21) Appl. No.: 12/112,780

(22) Filed: Apr. 30, 2008

(65) Prior Publication Data
US 2009/0327651 A1    Dec. 31, 2009

(51) Int. Cl.
G06F 9/00 (2006.01)
(52) U.S. Cl.
USPC ............................... 712/29; 712/11
(58) Field of Classification Search .................... 712/11, 712/29
See application file for complete search history.

(56) References Cited

U.S. PATENT DOCUMENTS

| 7,302,510 B2 | 11/2007 | Fredrickson |
| 7,865,650 B2 | 1/2011 | Marino |
| 7,917,730 B2 | 3/2011 | Marino |
| 2006/0206657 A1 | 9/2006 | Clark |
| 2007/0186027 A1 | 8/2007 | Klema |

OTHER PUBLICATIONS

Leverich et al.; "Comparing Memory System for Chip Multiprocessor"; ACM; 2007.*

Kumar et al.; "Interconnections in Multi-core Architectures: Understanding Mechanism, Overheads and Scaling"; IEEE; 2005.*
Hofstee—Power Efficient Processor Design and the Cell Processor, IBM (2005).
Intel1—The Intel Pentium III Processor Family Brought Us ..., Intel (2000).
Intel2—The Pentium 4 Processor Takes a Leap Forward, Delivering ..., Intel (2000).
Wang—The Cell Processor, ISSCC (2005).
Aggarwal—"Isolation in Commodity Multicore Processors", IEEE Computer Society (Jun. 2007).
Bergamaschi—"Exploring Power Management in Multi-Core Systems" Design Automation Conference, 2008 ASPDAC (Mar. 21, 2008).
Chen—"A Function-Based On-Chip Communication Design in the Heterogeneous Multi-Core Architecture", ICMUE—IEEE Computer Society (2007).
Demassas—"Comparison of Memory Write Policies for NoC Based Multicore Cache Content Systems", Design, Automation and Test in Europe (2008).

(Continued)

*Primary Examiner* — Eddie P Chan
*Assistant Examiner* — Benjamin Geib
(74) *Attorney, Agent, or Firm* — Matt Talpis; Mark P Kahler

(57) ABSTRACT

A symmetric multi-processing (SMP) processor includes a primary interconnect trunk for communication of information between multiple compute elements situated along the primary interconnect trunk. The processor also includes a secondary interconnected trunk that may be oriented perpendicular with respect to the primary interconnect trunk. The processor distributes data on-ramps and data off-ramps across the data lanes of a data trunk of the primary interconnect trunk to enable communication with compute elements and other structures both on-chip and off-chip.

20 Claims, 31 Drawing Sheets

OTHER PUBLICATIONS

Foster—First Silicon Functional Validation and Debug of Multicore Microprocessors, IEEE Transactions on Very Large Scale Integration (VLSI) Systems (May 2005).

Gschwind—"Synergistic Processing in Cell's Multicore Architecture", IEEE Computer Society (Mar. 2006).

Kirnan—"On-Chip Optical Technology in Future Bus-Based Multicore Designs", IEEE Comp. Soc. (Jan. 2007).

Kumar—"Interconnections in Multi-core Architectures . . . ", IEEE ISCA (2005).

McCool—"Scalable Programming Models for Massively Multicore Processors", Proc. IEEE (May 2008).

Shikano—"Software-Cooperative Power-Efficient Heterogeneous Multi-Core for Media Processing", Design Automation Conference (ASPDAC) (2008).

Wagner—"MCjammer: Adaptive Verification for Multi-core Designs".

* cited by examiner

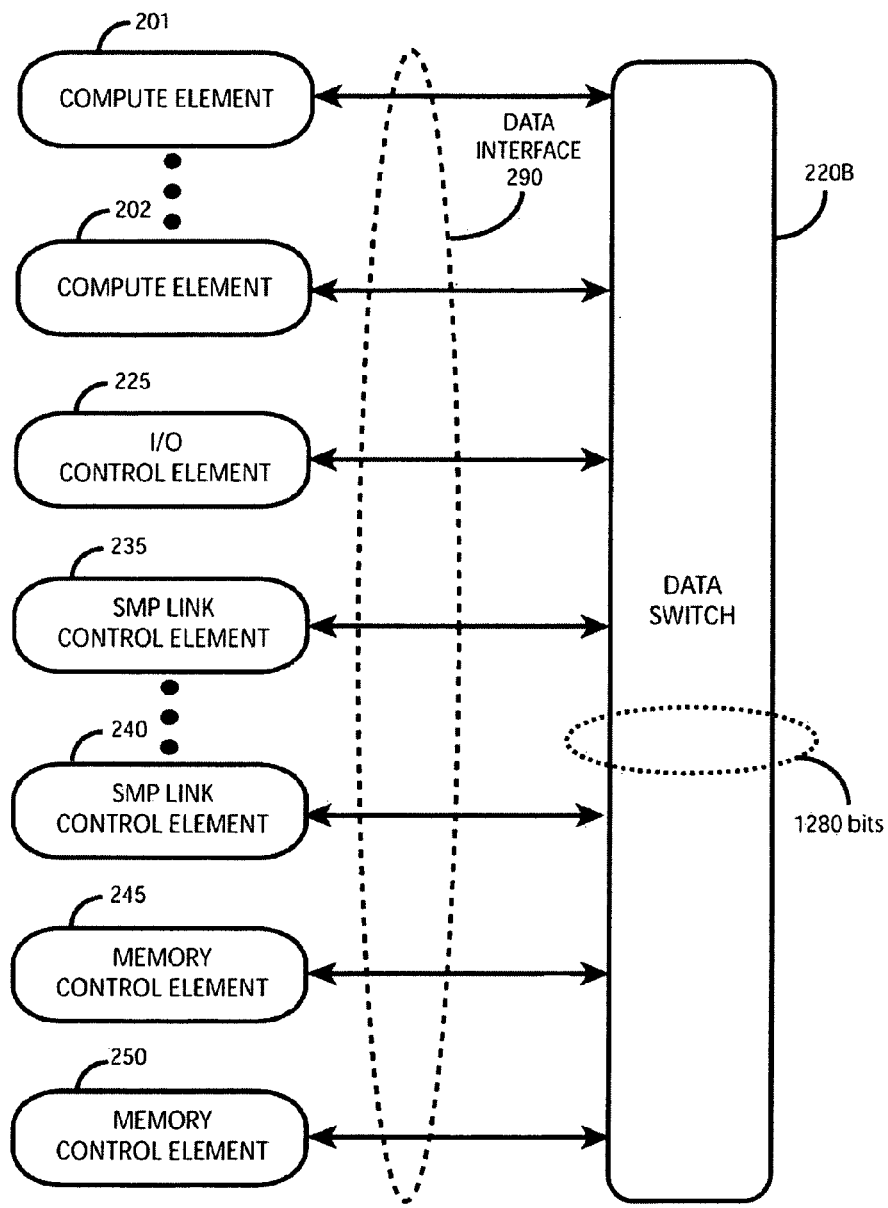

US 8,429,382 B2

INFORMATION HANDLING SYSTEM INCLUDING A MULTIPLE COMPUTE ELEMENT PROCESSOR WITH DISTRIBUTED DATA ON-RAMP DATA-OFF RAMP TOPOLOGY

This invention was made with United States Government support under Agreement No. HR0011-07-9-0002 awarded by DARPA. The Government has certain rights in the invention.

BACKGROUND

The disclosures herein relate generally to information handling systems, and more specifically, to information handling systems that employ processors with multiple compute elements.

Modern information handling systems (IHSs) frequently use processors with multiple compute elements, compute engines or cores on a common semiconductor die. This is one way of increasing information handling system performance. A communication bus on the die connects these compute engines together to enable coordinated information processing among the compute elements. An interconnect bus is another name for a communication bus that connects the compute engines of the processor. As the number of compute elements on a processor semiconductor die increases, the number of connecting runners or wires in the interconnect bus tends to increase as well. Increases in the number of connecting runners or wires in the interconnect bus tend to cause the size of the semiconductor die to likewise increase.

BRIEF SUMMARY

In one embodiment, a processor is disclosed that includes a substrate including a perimeter. The processor includes a primary interconnect trunk situated along a first axis of the substrate, the primary interconnect trunk including first and second opposed ends. The primary interconnect trunk includes a data trunk. A secondary interconnect trunk is situated along a second axis of the substrate, the second axis being substantially perpendicular to the first axis. The first axis intersects the second axis such that the primary and secondary interconnect trunks divide the processor into first, second, third and fourth quadrants. The secondary interconnect trunk includes first and second opposed ends. The processor also includes a plurality of compute elements situated in each of the first, second, third and fourth quadrants along the primary interconnect trunk. The compute elements of the first, second, third and fourth quadrants are switchably coupled to the data trunk via a plurality of data on-ramps that extend across a portion of the data trunk. The compute elements of the first, second, third and fourth quadrants are switchably coupled to the data trunk via a plurality of data off-ramps that extend fully across the data trunk.

In another embodiment, a method is disclosed that includes providing a plurality of compute elements located adjacent a primary interconnect trunk situated on a first axis of a substrate. The primary interconnect trunk includes a data trunk with first and second ends. The method also includes providing a secondary interconnect trunk on a second axis of the substrate, the second axis being substantially perpendicular to the first axis, the first axis intersecting the second axis such that the primary and secondary interconnect trunks divide the compute elements into first, second, third and fourth quadrants on the substrate. The method further includes switchably coupling the compute elements of the first, second, third and fourth quadrants to the data trunk via a plurality of data on-ramps that extend across a portion of the data trunk. The method also includes switchably coupling the compute elements of the first, second, third and fourth quadrants to the data trunk via a plurality of data off-ramps that extend fully across the data trunk.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 2G show a data interface that couples to the elements of the processor with bus master functionality in the disclosed IHS.

DETAILED DESCRIPTION

Figure 1:
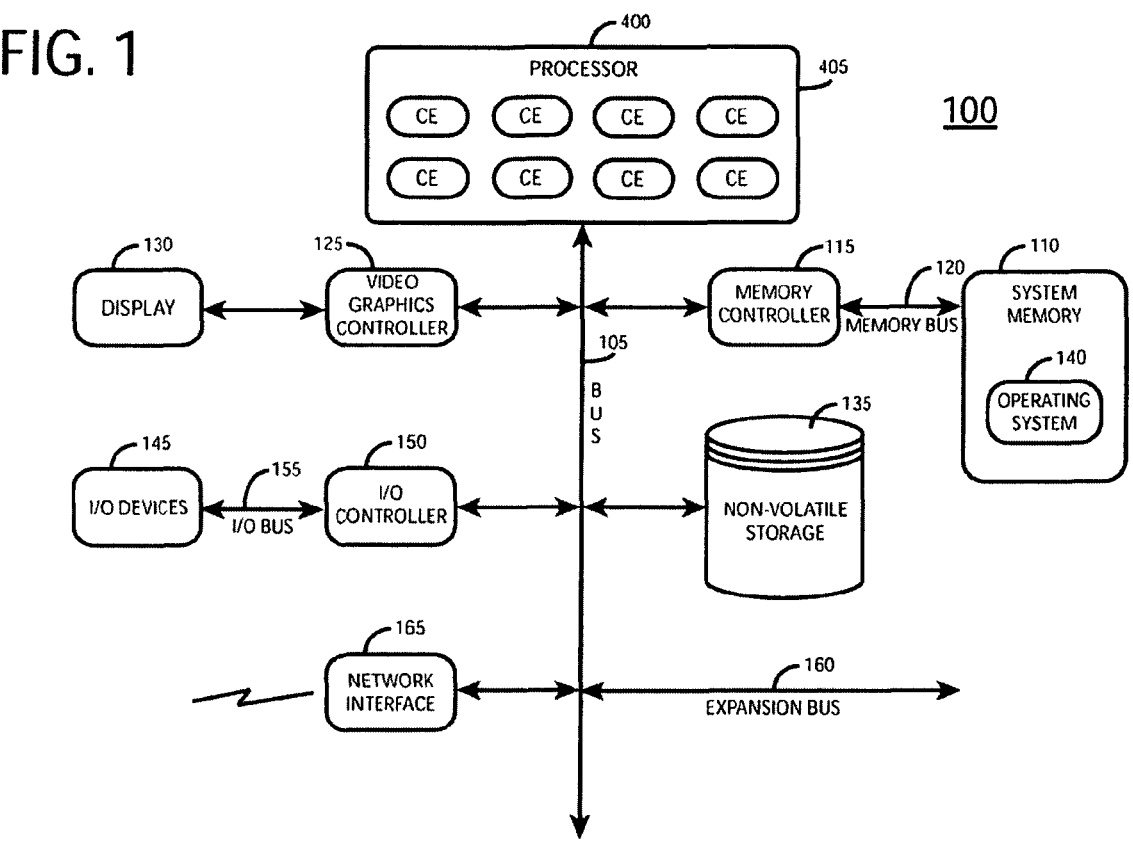
FIG. 1 shows a block diagram of one embodiment of the disclosed information handling system (IHS).

FIG. 1 shows an information handling system (IHS) 100 that includes a processor 400 having multiple compute elements (CEs) situated on a common semiconductor die 405. In one embodiment, processor 400 is an symmetric multi-processing (SMP) processor. Processor 400 is discussed in more detail below with reference to FIG. 4. Returning to FIG. 1, an IHS is a system that processes, transfers, communicates, modifies, stores or otherwise handles information in digital form, analog form or other form. IHS 100 includes a bus 105 that couples processor 400 to system memory 110 via a memory controller 115 and memory bus 120. A video graphics controller 125 couples display 130 to bus 105. Nonvolatile storage 135, such as a hard disk drive, CD drive, DVD drive, or other nonvolatile storage couples to bus 105 to provide IHS 100 with permanent storage of information. An operating system 140 loads in memory 110 to govern the operation of IHS 100. I/O devices 145, such as a keyboard and a mouse pointing device, couple to bus 105 via I/O controller 150 and I/O bus 155. One or more expansion busses 160, such as USB, IEEE 1394 bus, ATA, SATA, PCI, PCIE and other busses, couple to bus 105 to facilitate the connection of peripherals and devices to IHS 100. A network interface adapter 165 couples to bus 105 to enable IHS 100 to connect by wire or wirelessly to a network and other information handling systems. While FIG. 1 shows one IHS that employs processor 400, the IHS may take many forms. For example, IHS 100 may take the form of a desktop, server, portable, laptop, notebook, or other form factor computer or data processing system. IHS 100 may take other form factors such as a gaming device, a personal digital assistant (PDA), a portable telephone device, a communication device or other devices that include a processor and memory.

Figure 2A:
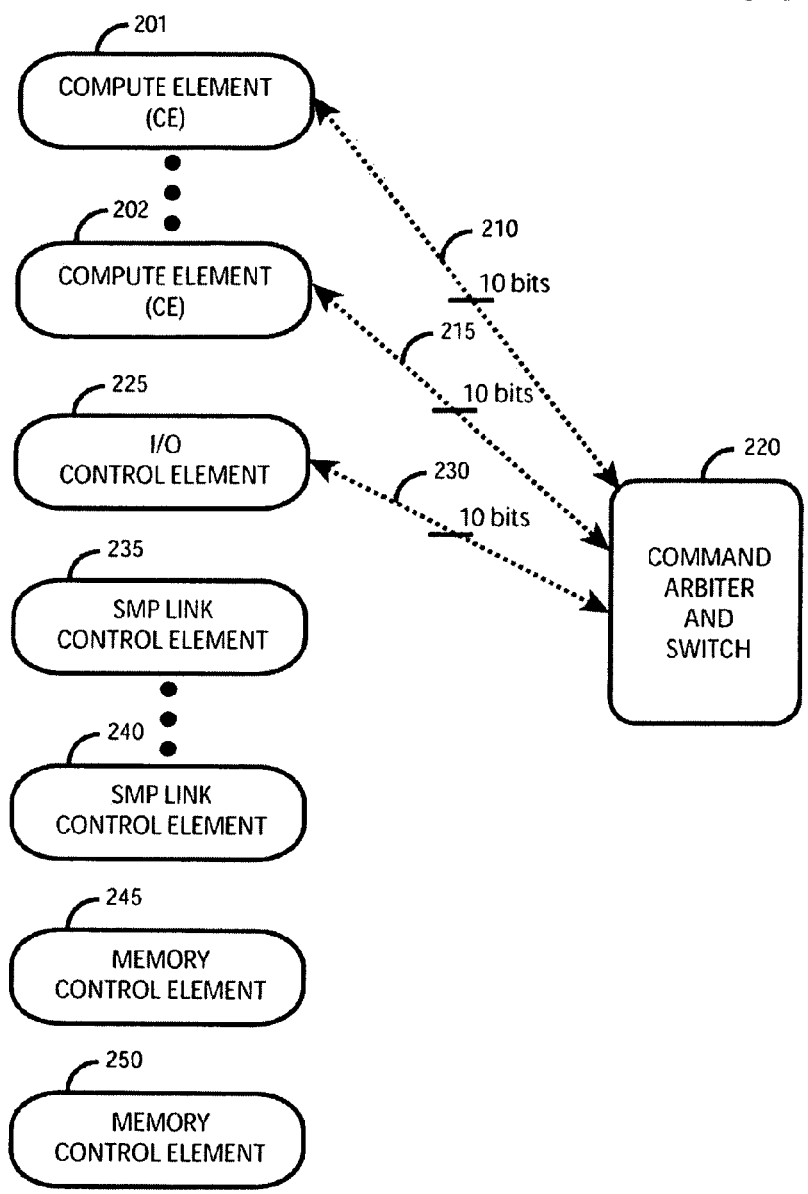
FIG. 2A shows illustrative request/grant interface logical connectivity between elements with bus master functionality and a command arbiter and switch in a processor of the disclosed IHS.

Before describing an embodiment of processor 400, a number of components or building blocks that are usable to form processor 400 are first discussed below. FIGS. 2A-2G show logical constructs in the multiple compute element processor 400 with focus on logical constructs involved in the transport of coherence protocol information and the transport of data among compute elements. As noted above, processor 400 includes multiple compute element (CEs). For example, in one embodiment processor 400 includes eight or more compute elements such as compute elements 201 and 202 shown in FIG. 2A. A compute element such as compute element 201 may take the form of a processor core. Compute elements are substantially non-porous in the sense that connective wire runners unrelated to a particular compute element may not cross the particular compute element's area or real estate on a semiconductor die. In the example of FIG. 2A, compute elements such as compute elements 201 and 202 couple or connect via 10 bit request/grant busses 210 and 215, respectively, to a command arbiter and switch 220. Busses 210 and 215 may employ bit widths other than 10 bits. The bit widths of busses, interfaces and other structures in this document are representative and should not be taken as limiting.

A compute element such as compute element 201 may send a request to send a coherence command to command arbiter and switch 220. FIG. 2A shows illustrative request/grant interface logical connectivity between elements with bus master functionality such as compute elements 201 and 202 and command arbiter and switch 220. Command arbiter and switch 220 may form part of a centralized per-chip coherence command arbiter in a bus control element located on the semiconductor die. Centralized per-chip coherence command arbiter or coherence command arbiter are other terms for command arbiter and switch 220. FIG. 2A also shows an I/O control element 225 that couples to command arbiter and switch 220 via a 10-bit request/grant bus 230. I/O control element 225 is an example of one I/O control element that enables off-chip communications, namely communication with processors on other semiconductor dies or chips.

FIG. 2A also shows symmetric multi-processor (SMP) link control elements such as SMP link control elements 235 and 240 that are usable for off-chip communications with other SMP type processors. FIG. 2A further shows memory control elements 245 and 250 that may communicate with off-chip memory. In other words, memory control elements 245 and 250 enable I/O activities with respect to off-chip memory. Processor 400 may thus communicate with off-chip memory as well as other processors such as off-chip SMP processors. Coherence commands provide a mechanism by which elements such as compute elements 201, 202 and I/O control element 225 may request access to blocks of storage or off-chip memory. In response to a request from a requesting element such as compute element 201 on request/grant bus 210, the centralized per-chip coherence command arbiter 220 may grant permission for the requesting element to send a coherence command. Command arbiter 220 may send a grant response to the requesting element, namely compute element 201, on the same request/grant bus 210.

Figure 2B:
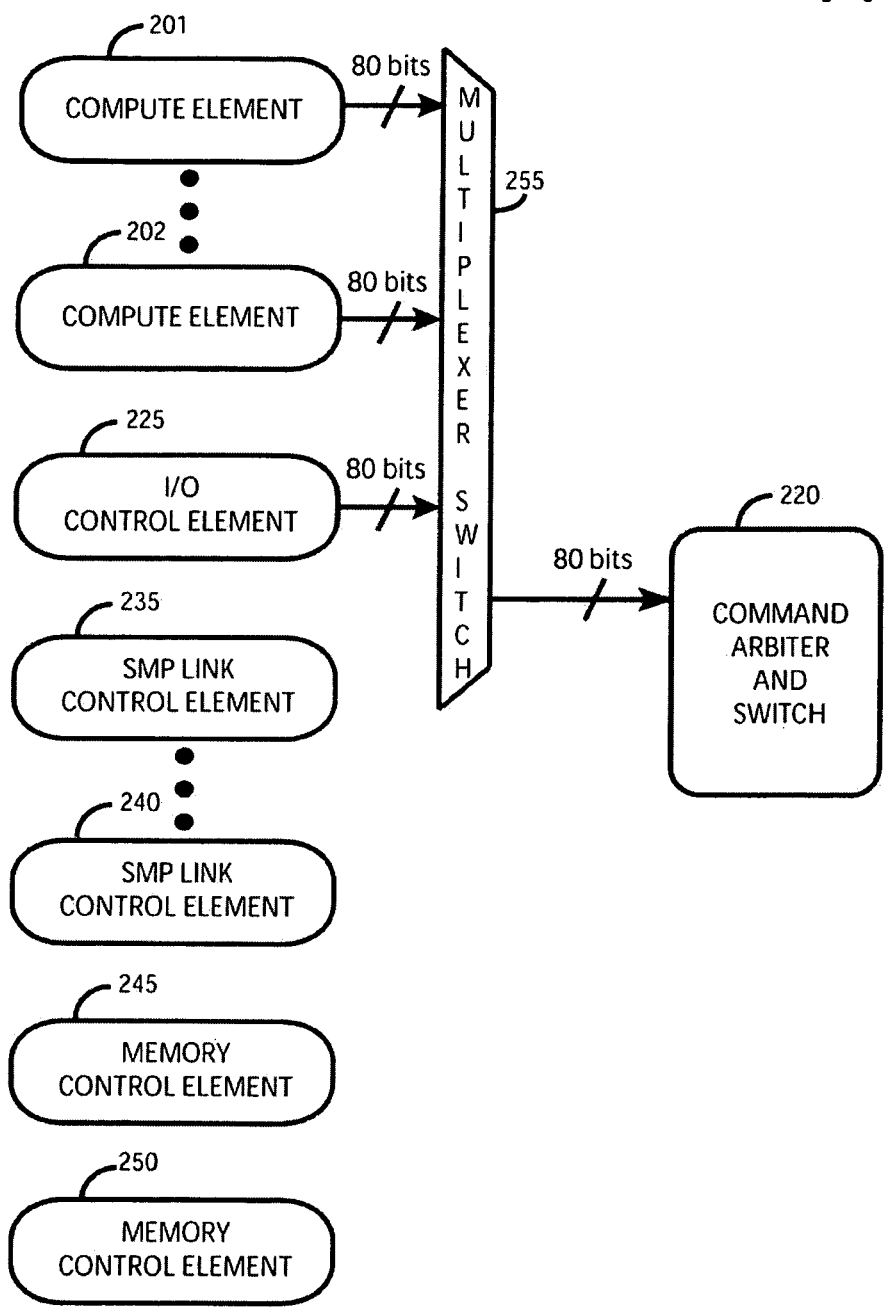
FIG. 2B shows multiple compute elements coupled via a multiplexer to the command arbiter and switch.

FIG. 2B shows the same elements as FIG. 2B except that compute elements 201 and 202 and I/O control element 225 couple to command arbiter and switch 220 via a multiplexer switch 255. In this particular example, multiplexer switch 255 is an 80 bit multiplexer switch that supports an 80-bit coherence command that the requesting element sends to command arbiter and switch 220. Again, bit width values in this document are examples and should not be taken as limiting. Once the centralized per-chip coherence command arbiter 220 grants permission to the requesting element to send a coherence command, multiplexer switch 255 routes the coherence command from the requesting element to coherence command arbiter 220. FIG. 2B illustrates command interface logical connectivity between elements with bus master functionality, such as compute elements 201, 202 and I/O control element 225, and centralized per-chip coherence arbiter and switch 220. A snoop interface may carry coherence command and associated routing and control information to elements with bus snooper functionality in processor 400.

Figure 2C:
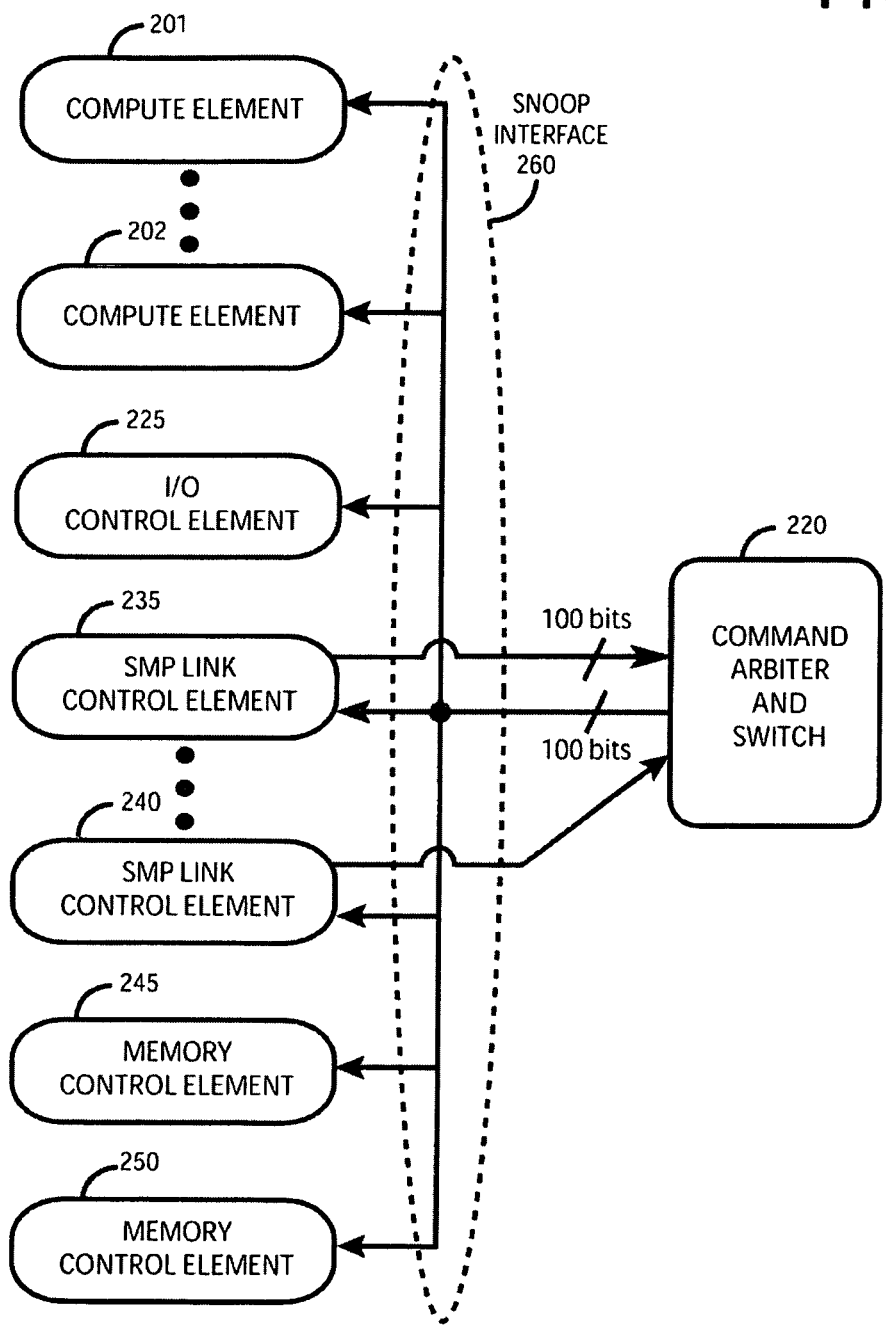
FIG. 2C shows a snoop interface between elements of the processor of the disclosed IHS.

FIG. 2C shows a snoop interface 260, in terms of bit width, that couples between the centralized per-chip coherence command arbiter switch 220 to those elements exhibiting bus snooper functionality. Those elements exhibiting bus snooper functionality include compute elements 201, 202, I/O control element 225, SMP link control elements 235, 240 and memory control elements 245, 250. The purpose of SMP link control elements 235, 240 is to route snoop content to other chips, namely other processors with SMP capability. In one embodiment, those other chips are off-chip with respect to processor 400. Those other chips with SMP capability may include other chips similar to processor 400. Such other chips with SMP capability may include a centralized per-chip coherence command arbiter switch like coherence arbiter and switch 220. Such other chips with SMP capability may also include SMP link control elements like SMP link control elements 235, 240. Processor 400 sends snoop content via SMP link control elements 235, 240 to other chips or processors with SMP capability, namely recipient processors (not shown). When the snoop information arrives at a recipient SMP link control element of other chips or processors with SMP capability, the recipient SMP link control element sends the snoop information to the centralized per-chip coherency command switch of that particular recipient processor. The centralized per-chip coherency command arbiter switch of that recipient processor then re-distributes the snoop information to elements exhibiting bus snooper functionality within the recipient processor. Processor 400 also distributes the snoop information on-chip, that is to those elements of processor 400 that exhibit bus snooper functionality.

The purpose of snoop interface 260 is to enable the maintenance of coherency of data within memory blocks (not shown) that are off-chip with respect to processor 400. Elements that exhibit bus snooper functionality on-chip, i.e. within processor 400, as well as elements that exhibit bus snooper functionality on another chip, i.e. off-chip with respect to processor 400 but on another chip, may attempt to access memory blocks. Snoop interface 260 assists in maintaining memory coherency. Different elements may maintain copies of data in off-chip memory. Snoop interface 260 aids in tracking of which copies of a data block in memory are currently valid. An element exhibiting bus snooper functionality is an example of a snooper. A snooper sends a partial response to command arbiter and switch 220. Partial responses (PRESPs) communicate a snooper's authorization state with respect to a given requested storage block of data in memory. Partial responses (PRESPs) by snoopers may also communicate denial of access to a requested storage block of data by a snooper for a number of reasons.

Figure 2D:
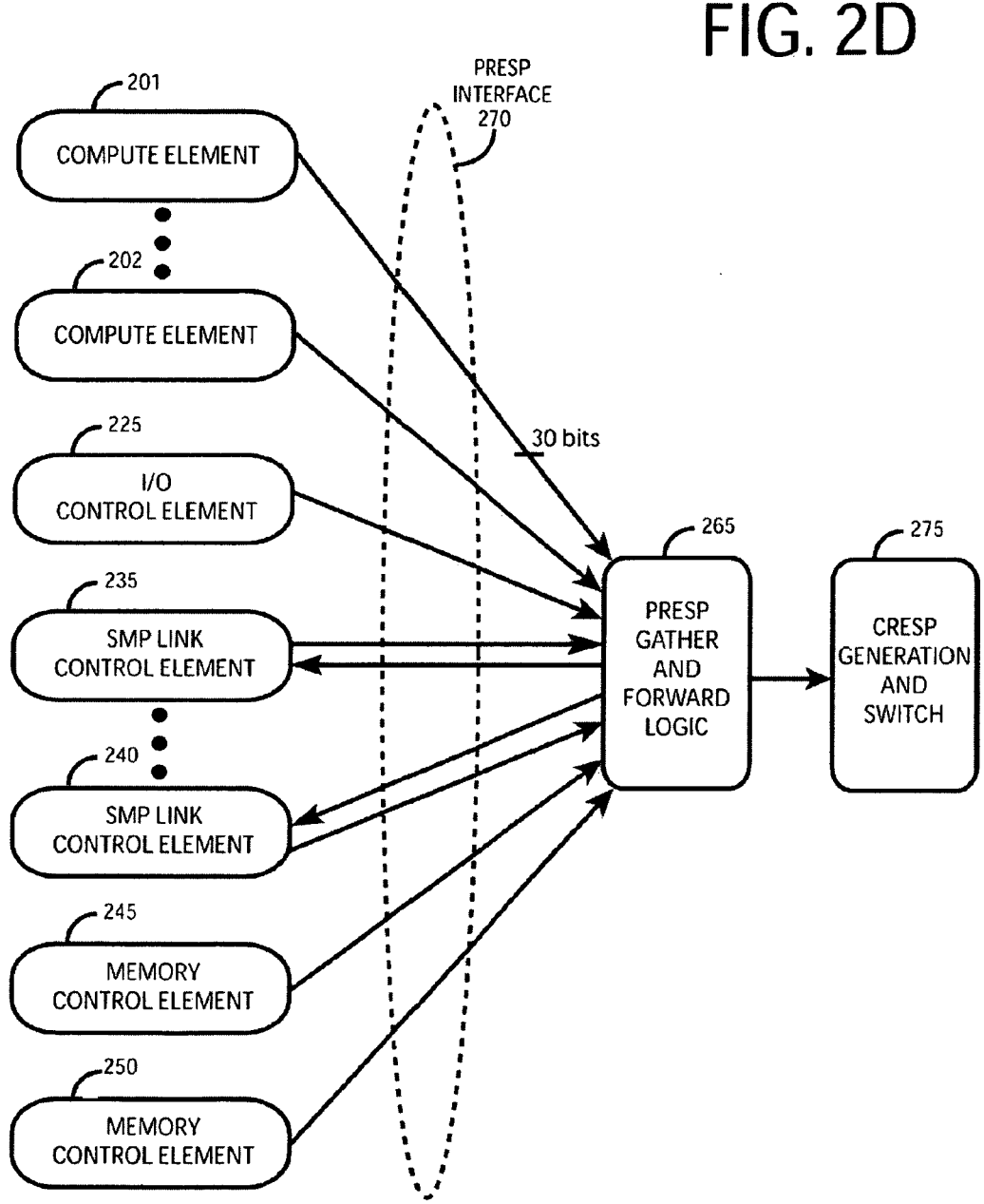
FIG. 2D illustrates partial response (PRESP) interface logical connectivity between elements exhibiting bus snooper functionality in the processor of the disclosed IHS.

FIG. 2D illustrates partial response (PRESP) interface logical connectivity, in terms of bit width, between elements exhibiting bus snooper functionality and centralized per-chip PRESP gathering and forwarding logic 265. Partial responses (PRESPs) from snoopers on processor chips other than processor 400's chip or die ultimately route back via an SMP link control element to a master element's processor chip. A master element is the requesting element that initiates the coherence command for which PRESP gather and forward logic 265 collects PRESPs. On a particular processor chip 400, elements that snoop communicate their respective partial responses (PRESPs) via PRESP interface 270. Those elements that snoop include compute elements 201, 202, I/O control element 225, SMP link control elements 235, 240 and memory control elements 245, 250. PRESP gathering and forwarding logic 265 couples to CRESP generation and switch logic 275.

Figure 2E:
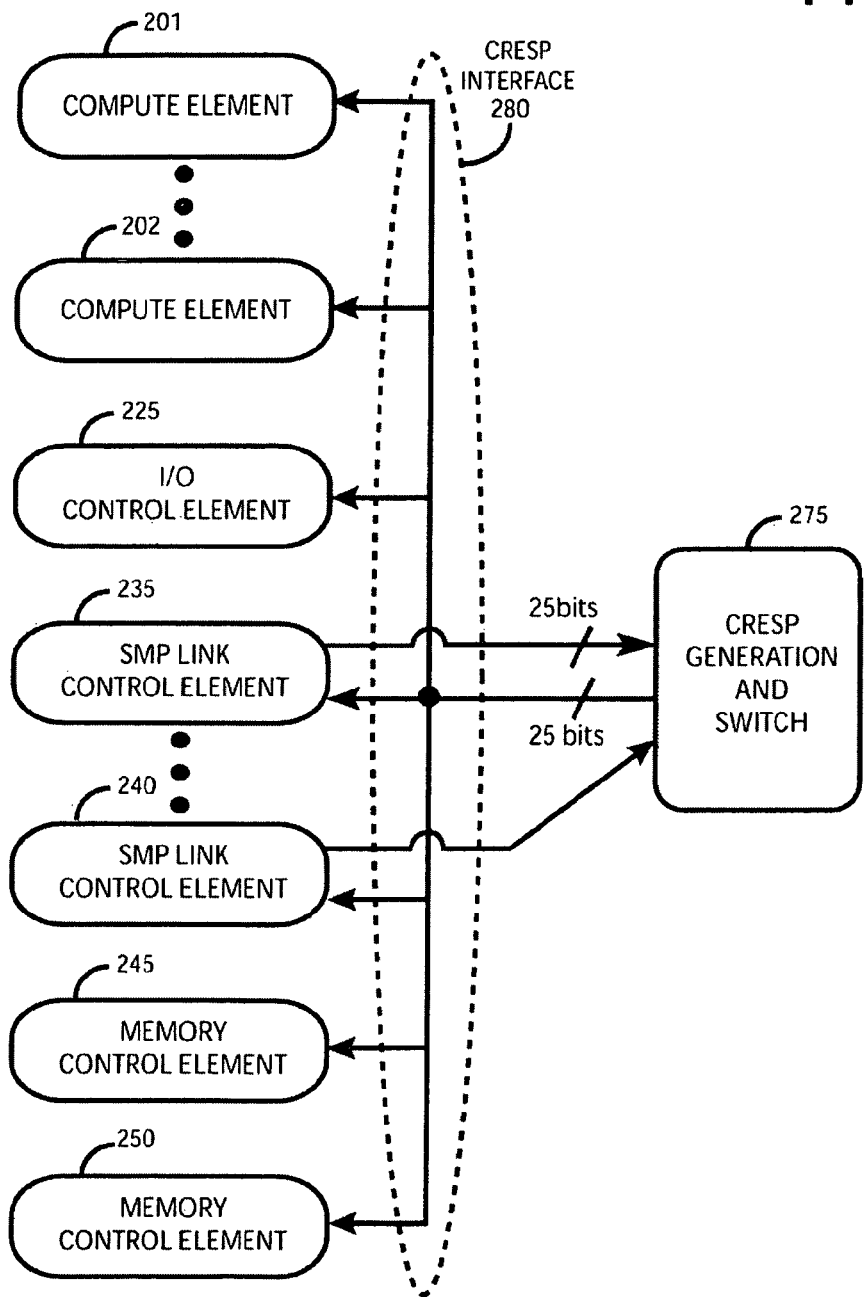
FIG. 2E shows combined response (CRESP) generation and switch logic that couples via a CRESP interface to elements that snoop in the processor of the disclosed IHS.

FIG. 2E shows combined response (CRESP) generation and switch logic 275 that couples via CRESP interface 280 to elements that snoop. As described above with reference to FIG. 2D, partial responses (PRESPs) from snoopers on processor chips other than the processor 400 chip route back via an SMP link control element to a master element's processor chip, such as processor chip 400. At this point, combined response generation (CRESP) logic 270 of FIG. 2D and FIG. 2E consolidates partial responses (PRESPs) to drive a single centralized memory authorization decision, namely the combined response (CRESP). FIG. 2E shows the combined response (CRESP) interface 280 that communicates the combined response (CRESP) back to the elements that snoop, both on-chip and off-chip (i.e. on another processor chip other than processor 400). FIG. 2E shows illustrative CRESP interface 280 logical connectivity, in terms of bandwidth, from a centralized per-chip CRESP generator and switch 275 to all elements with master and snooper functionality, including SMP link control elements whose purpose is to route CRESP content to processor chips other than processor 400, namely a recipient SMP processor. Upon arrival of the CRESP content at SMP link control elements of a recipient SMP processor, those SMP link control elements supply the CRESP content to a centralized per-chip CRESP generation switch on the recipient SMP processor. The centralized per-chip CRESP generation switch of the recipient SMP processor redistributes the CRESP content to snoopers within the recipient SMP processor. As a consequence of many coherence authorization decisions by a centralized CRESP generator and switch on a processor such as processor 400, the particular data that associates with a storage block may transfer from a current owner to a new owner or repository memory location.

Figure 2F:
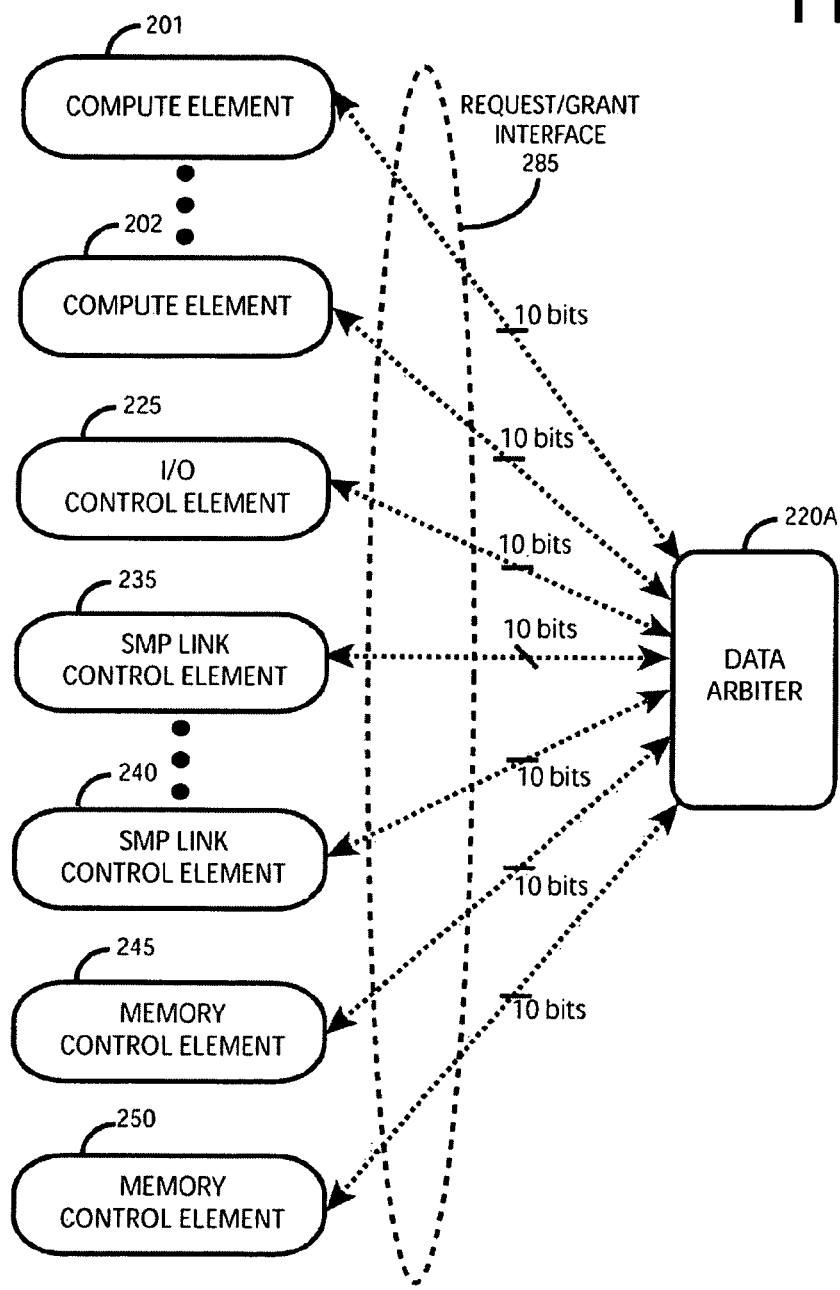
FIG. 2F shows more detail with respect to the request/grant interface between elements with bus master functionality and the centralized per-chip data arbiter.

FIG. 2F shows more detail with respect to the request/grant interface 285 between elements with bus master functionality and the centralized per-chip data arbiter 220A. Centralized per-chip data arbiter and switch 220 includes a data arbiter 220A, shown in FIG. 2F, and a data switch 220B, shown in FIG. 2G. Referring now to FIG. 2F, each element with bus master capability communicates with data arbiter 220A via a respective 10-bit bus within request/grant interface 285. In this embodiment, elements 201, 202, 225, 235, 240, 245 and 250 exhibit bus master functionality.

FIG. 2G show a data interface 290 that couples to the elements of processor 400 with bus master functionality, namely elements 201, 202, 225, 235, 240, 245 and 250. Once the centralized per-chip data arbiter 220A of FIG. 2F grants permission for the requesting element to send a data block of memory storage, processor 400 routes the data block through data switch 220B of FIG. 2G to a recipient element. FIG. 2G thus illustrates data interface logical connectivity between elements with bus master functionality and centralized per-chip data switch 220B. In this particular embodiment, data switch 220B exhibits a bit width of 1280 bits which corresponds to 8 data lanes or busses wherein each data lane includes 16 bytes with 10 bits per byte. Data lanes will be discussed in more detail below.

Figure 3A:
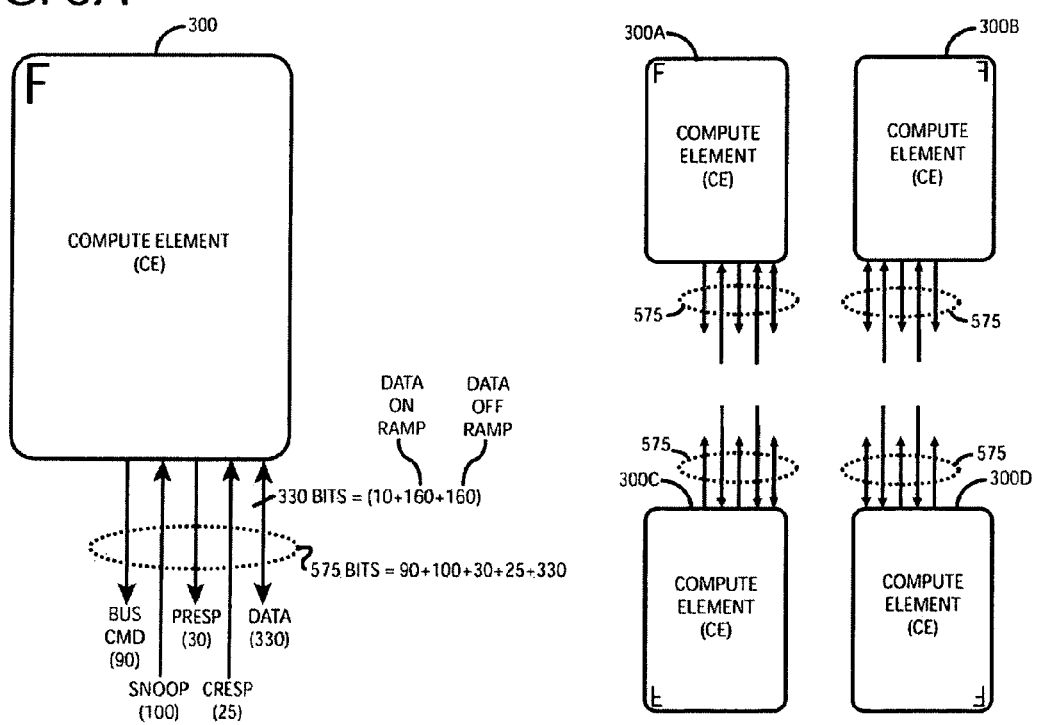
FIG. 3A shows different orientations of compute elements in the processor of the disclosed IHS.

FIG. 3A-3G illustrate a set of physical building blocks that processor 400 employs to provide the functionality shown and described in FIGS. 2A-2G. FIG. 3A shows a compute element (CE) 300 that may include a processor core or cores and associated cache hierarchy. In some embodiments, compute element 300 may include a specialized accelerator or co-processor, or other functional element. The letter "F" in the upper left corner of compute element 300 indicates the spatial orientation of compute element 300. Compute elements 300A, 300B, 300C and 300D depict 4 different orientations of compute element 300. Compute element 300A exhibits the same orientation as enlarged compute element 300 on the left of FIG. 3A. The unchanged "F" in the upper left corner of compute element 300A exhibits the same orientation as the "F" in the upper left corner of enlarged compute element 300. A processor designer may flip or mirror compute element 300 about its vertical axis to form compute element 300B as indicated by the flipped or mirrored "F" in the upper right corner of compute element 300B. The processor designer may flip or mirror compute element 300A about its horizontal axis to form compute element 300C as indicated by the flipped or mirrored "F" in the lower left corner of compute element 300C. The processor designer may flip or mirror compute element 300B about its horizontal axis to form compute element 300D as indicated by the flipped or mirrored "F" in the lower right corner of compute element 300D.

Compute element 300 operates as a bus master for coherence commands as indicated by its bus command (BUS CMD) input. The numeral 90 in parentheses adjacent the BUS CMD input indicates the bit width of that input. This document uses such bit widths in conjunction with names to identify inputs, outputs, and busses of processor 400. The BUS CMD (90) output will couple to 90 wire runners or interconnects in processor 400 as described below in more detail. Once again, the bit widths described in this document are illustrative and not to be taken as limiting.

Compute element 300 operates as a snooper for coherency commands via SNOOP (100) output. The SNOOP output is a 100-bit output in this particular example. When operating as a snooper, compute element 300 provides partial responses (PRESPs) at the PRESP (30) output and reacts to combined responses (CRESPs) received at the CREPS (25) input. Compute element 300 includes data input/output DATA (330). Input/output DATA (330) sends 160 bits of data plus control words and receives 160 bits of data plus control words. Input/output (330) includes 10 bits of data from request/grant control interface 285 of FIG. 2F. Returning to FIG. 3A, BUS CMD (90), SNOOP (100), PRESP (30), CRESP (25) and DATA (330) together form a 575 bit interface. This interface will be indicated or identified subsequently as 575. As mentioned above, compute elements such as compute elements 300A, 300B, 300C and 300D are substantially non-porous in the sense that connective wire runners unrelated to a particular compute element may not cross the particular compute element's area or real estate on the semiconductor die. Of the 330 bits of DATA, 160 bits correspond to a data on-ramp and 160 bits correspond to a data-off ramp. As discussed in more detail below, data on-ramps and data off-ramps allow a compute element such as compute element 300 to switchably access particular data lanes within a data trunk in primary interconnect trunk 407.

Figure 3B:
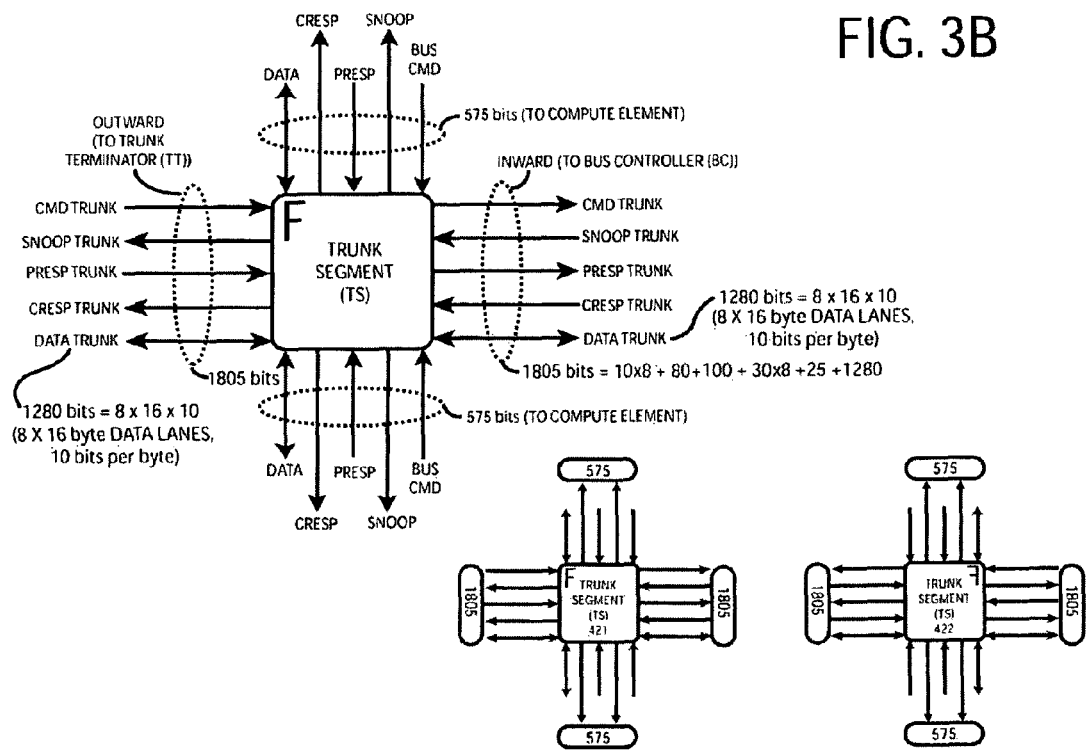
FIG. 3B shows different orientations of a trunk segment in the processor of the disclosed IHS.

Referring briefly to FIG. 4 before returning to FIGS. 3A-3G, FIG. 4 shows an embodiment of the processor 400 situated on semiconductor die 405. Semiconductor die 405 includes a perimeter 406 with 4 substantially perpendicular sides 406A, 406B, 406C and 406D that form a rectangle. This particular embodiment includes two copies of compute elements 300A, 300B, 300C and 300D that the designer arranges as shown in FIG. 4. Processor 400 includes a primary interconnect trunk 407 situated along a major axis 410A-410B of processor 400. Primary interconnect trunk 407 includes a centralized bus control element (BC) 420, trunk segments (TS) 421, 422, trunk terminators (TT) 423, 424, and memory control elements (MC) 425, 426. Primary interconnect trunk 407 is a main on-chip interconnect trunk among the eight compute elements 300A, 300A, 300B, 300B, 300C, 300C, 300D, 300D. Processor 400 also includes a secondary interconnect trunk 427 situated along another major axis 430A-430B of processor 400. Major axis 430A-430B is substantially perpendicular to major axis 410A-410B. Secondary interconnect trunk 427 is substantially perpendicular to primary interconnect trunk 407. Secondary interconnect trunk 427 includes nodal SMP link control element (NS) 435 and global SMP link and I/O control element 435 (GS I/O) 440. Processor 400 uses primary interconnect trunk 407 mainly for on-chip or intra-chip communication, for example, communication among compute elements 300A-300D along axis 410A-410B. Processor 400 uses secondary interconnect trunk 427 including NS 435 and GS 440 mainly for off-chip communication, for example, communications between processor 400 and a processor or processors on other integrated circuit (IC) chips. In this particular embodiment, primary interconnect trunk 407 intersects secondary interconnect trunk 427 at bus control element 420. In other words, processor 400 locates the bus control element 420 at the intersection of axis 410A-410B and axis 430A-430B in such an embodiment. Processor 400 is discussed in more detail below.

Returning to FIGS. 3A-3G, FIG. 3B shows a simplified pin-out of a trunk segment (TS) such as TS 421 and TS 422. Trunk segment (TS) is a repeatable segment of primary trunk 407 that exhibits a structure to manage intra-chip coherence and data communication. Referring to the enlarged trunk segment (TS) on the left side of FIG. 3B, trunk segment (TS) supports top and bottom connectivity to compute elements. More particularly, trunk segment (TS) includes a 575-bit interface (DATA, CRESP, PRESP, SNOOP, BUS CMD) at the top of trunk segment (TS) for connecting to a compute element. Trunk segment (TS) also includes another 575-bit interface (DATA, CRESP, PRESP, SNOOP, BUS CMD) at the bottom of trunk segment (TS) for connecting to another compute element. Trunk segment (TS) couples in-line with respect to primary interconnect trunk 407 as seen in FIG. 4. Trunk segment (TS) acts as a pass-through for signals provided thereto and thus acts as a trunk extender. Returning to FIG. 3B, trunk segment (TS) includes a 1805 bit INWARD trunk interface (CMD TRUNK, SNOOP TRUNK, PRESP TRUNK, CRESP TRUNK, DATA TRUNK). Trunk segment (TS) also includes a 1805 bit OUTWARD trunk interface (CMD TRUNK, SNOOP TRUNK, PRESP TRUNK, CRESP TRUNK, DATA TRUNK). The DATA TRUNK portion of the 1805 bit inward and outward trunk interfaces include 1280 bits that form eight (8) 16 byte data lanes, wherein each byte is 10 bits wide, as discussed in more detail below. Each data lane exhibits 160 bits in this particular example. The lower right portion of FIG. 3B shows scaled-down versions of trunk segment (TS), namely a trunk segment (TS) 421 exhibiting the same spatial orientation as the enlarged trunk segment (TS) in the upper left of FIG. 3B, and a trunk segment (TS) 422 exhibiting an orientation horizontally flipped or mirrored with respect to trunk segment (TS) 421. Bubbles with a number therein represent the bit widths of the interconnects on each of the four sides of trunk segments 421 and 422. Bubbles with 575 therein represent bit widths for interconnects to top and bottom compute elements (CE) while bubbles with 1805 therein represent interconnects to primary trunk 407. As seen in FIG. 4, trunk segment (TS) 421 forms part of primary trunk 407 between bus control element (BC) 420 and trunk terminator (TT) 423. Another trunk segment (TS) 422 forms part of primary trunk 407 between bus control element (BC) 420 and trunk terminator (TT) 424.

Figure 3C:
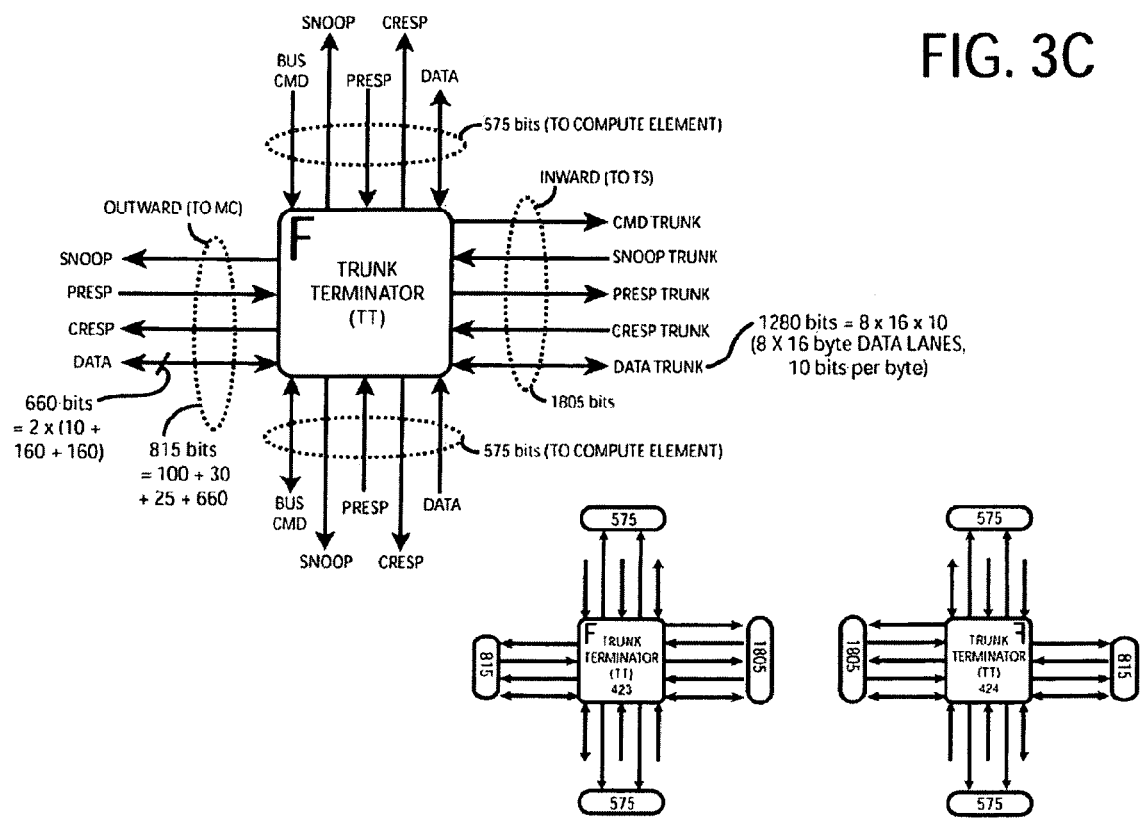
FIG. 3C shows different orientations of a trunk terminator in the processor of the disclosed IHS.
Figure 4:
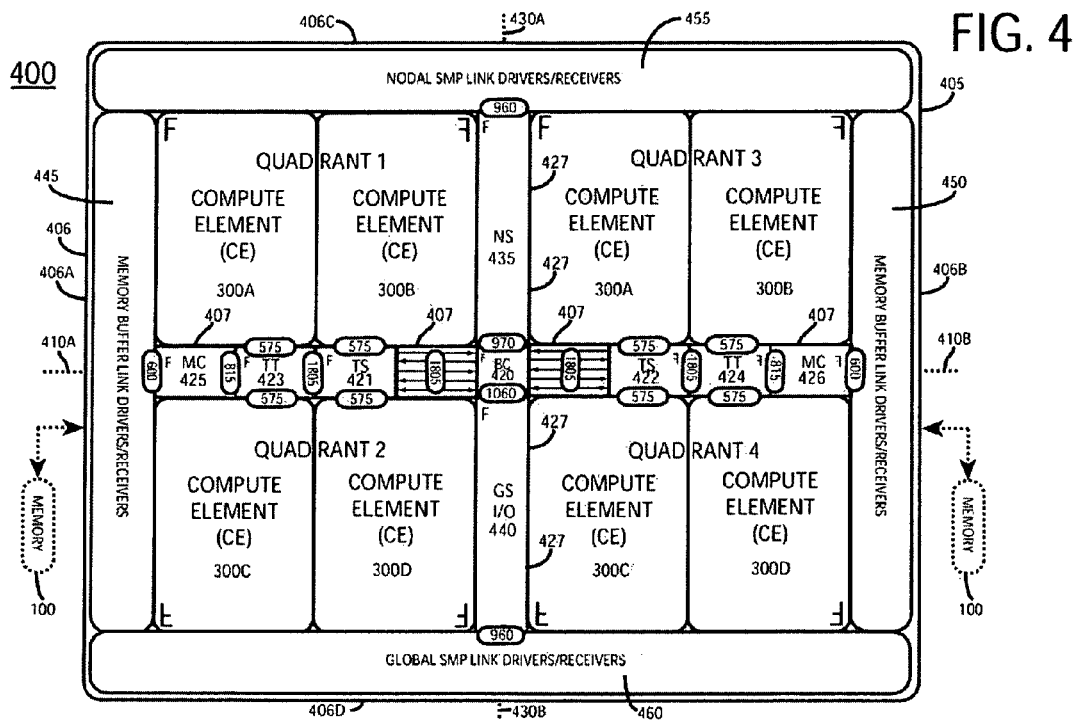
FIG. 4 shows one embodiment of the processor of the disclosed IHS.

FIG. 3C shows a simplified pin-out of an a trunk terminator (TT) that forms part of primary trunk 407 between a trunk segment (TS) such as TS 421 and a memory control (MC) element 425, as seen in FIG. 4. Trunk terminator (TT) is a segment of primary trunk 407 that exhibits a structure to manage intra-chip coherence and data communication. A trunk terminator (TT), such as TT 423, supports and terminates primary trunk 407 at a memory controller (MC), such as MC 425, which may be part of primary trunk 407, as discussed below in more detail. Referring to the enlarged trunk terminator (TT) on the left side of FIG. 3C, trunk terminator (TT) supports top and bottom connectivity to compute elements. More particularly, trunk terminator (TT) includes a 575-bit interface (DATA, CRESP, PRESP, SNOOP, BUS CMD) at the top of trunk terminator (TT) for connecting to a compute element. Trunk terminator (TT) also includes another 575-bit interface (DATA, CRESP, PRESP, SNOOP, BUS CMD) at the bottom of trunk terminator (TT) for connecting to another compute element. Trunk terminator (TT) couples in-line with respect to primary interconnect trunk 407 as seen in FIG. 4. Returning to FIG. 3C, trunk terminator (TT) includes an 1805 bit INWARD trunk interface (CMD TRUNK, SNOOP TRUNK, PRESP TRUNK, CRESP TRUNK, DATA TRUNK). The DATA TRUNK portion of the 1805 bit inward trunk interface includes 1280 bits that form eight (8) 16 byte data lanes, wherein each byte is 10 bits wide, as discussed in more detail below. Each data lane exhibits 160 bits in this particular example. Trunk terminator (TT) also includes a smaller 815-bit OUTWARD trunk interface (SNOOP TRUNK, PRESP TRUNK, CRESP TRUNK, DATA TRUNK) for coupling to a memory controller (MC) element. The lower right portion of FIG. 3C shows scaled-down versions of trunk terminator (TT) namely a trunk terminator (TT) 423 exhibiting the same spatial orientation as the enlarged trunk segment (TS) in the upper left of FIG. 3C, and a trunk terminator (TT) 424 exhibiting an orientation horizontally flipped or mirrored with respect to trunk terminator (TT) 423. Bubbles with a number therein represent the bit widths of the interconnects on each of the four sides of trunk terminators 423 and 424. Bubbles with 575 therein represent bit widths for interconnects to compute elements (CE) while bubbles with 1805 therein represent interconnects inward to a trunk segment of primary trunk 407. Bubbles with an 815 therein represent bit widths for interconnects outward to a memory control element (MC). As seen in FIG. 4, trunk terminator (TT) 423 forms part of primary trunk 407 between trunk segment (TS) 421 and memory controller element (MC) 425. Another trunk terminator (TT) 424 forms part of primary trunk 407 between trunk segment (TS) 422 and memory controller element (MC) 426.

Figure 3D:
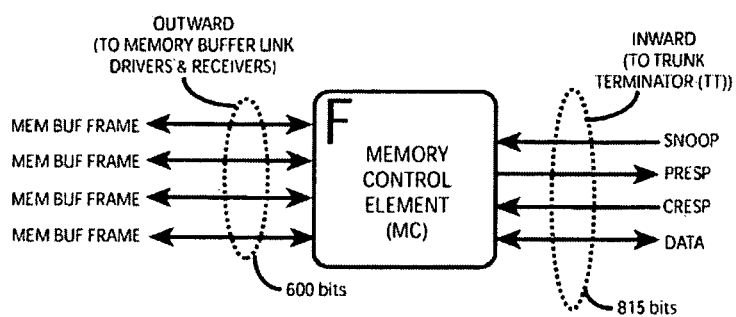
FIG. 3D shows different orientations of a memory control element in the processor of the disclosed IHS.
Figure 3D:

FIG. 3D shows a simplified pin-out of a memory control element (MC), or other perimeter facing element, that exhibits a structure wherein one side attaches or interconnects to an exterior endpoint segment of primary trunk 407, such as trunk terminator (TT) 423 and 424, as shown in FIG. 4. Memory controller elements (MC) 425 and 426 are examples of memory controller elements. Another side of a memory control element (MC), such as MC 425 and 426, attaches or interconnects with a perimeter I/O region of processor 400, such as memory buffer link drivers/receivers 445 and 450. In this embodiment, a compute element (CE), such as compute elements 300A-300D, is a master for coherence. A compute element may be a master for coherence commands via a BUS CMD interface added to both memory control elements (MC) and an exterior endpoint segment such as trunk terminator TT. In the embodiment of FIG. 3D, memory control elements (MC) are not masters for coherence. Any element with a BUS CMD interface into primary trunk 407 may be a master for coherence.

Referring to the enlarged memory control element (MC) on the upper left side of FIG. 3D, memory control element (MC) includes an 815 bit INWARD trunk interface (SNOOP, PRESP, CRESP, DATA) that couples to a trunk terminator (TT) such as TT 423, 424. Memory control element (MC) also includes a smaller 600-bit OUTWARD trunk interface (MEM BUF FRAME, MEM BUF FRAME, MEM BUF FRAME, MEM BUF FRAME) for coupling to memory buffer link drivers and receivers. Memory control element (MC) enables I/O to an off-chip memory, i.e. memory (not shown) that is off-chip with respect to processor 400 in one embodiment. The memory control element (MC) of FIG. 3A is a snooper for coherence commands via SNOOP on the 815-bit width INWARD bus. Memory control element (MC) provides partial responses via PRESP on the 815-bit width INWARD bus and reacts to combined responses via CRESP on the 815-bit width INWARD bus.

The lower right portion of FIG. 3D shows scaled-down versions of memory control element (MC) namely a memory control element (MC) 425 exhibiting the same spatial orientation as the enlarged memory control element (MC) in the upper left of FIG. 3D, and a memory control element (MC) 426 exhibiting an orientation horizontally flipped or mirrored with respect to memory control element (MC) 425. Bubbles with a number therein represent the bit widths of the interconnects on each of the two horizontal opposed sides of memory control element (MC) 425 and 426. More particularly, bubbles with 815 therein represent bit widths for interconnects inward to a trunk terminator of primary trunk 407. Bubbles with a 600 therein represent bit widths for interconnects outward to memory buffer link drivers and receivers. As seen in FIG. 4, memory control element (MC) 425 forms part of primary trunk 407 as an endpoint for primary trunk 407. More particularly, memory control element (MC) 425 couples between trunk terminator (TT) 423 and memory buffer link drivers/receivers 445. A memory 100, shown in dashed lines, couples to memory buffer link driver/receivers 445 to provide off-chip memory to processor 400. In this manner, primary trunk 407 provides I/O for memory transactions with memory 100 via TS 421, TT 423 and MC 425. A memory 100', shown in dashed lines, couples to memory buffer link driver/receivers 450 to provide off-chip memory to processor 400. In this manner, primary trunk 407 provides I/O for memory transactions with memory 100' via TS 422, TT 424 and MC 426. In practice, memory 100 and memory 100' may be the same memory.

Figure 3E:
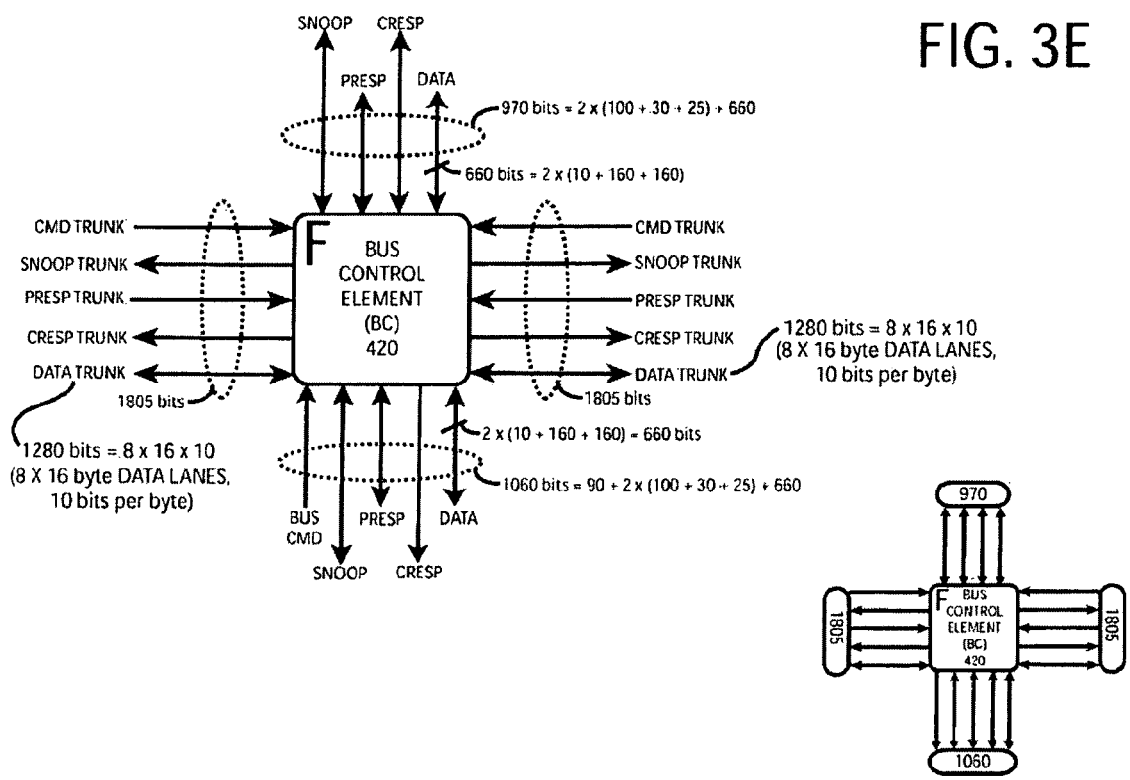
FIG. 3E shows different orientations of a bus control element in the processor of the disclosed IHS.

FIG. 3E shows a simplified pin-out of a centralized bus control element (BC) 420 that locates at the intersection of primary interconnect trunk 407 and secondary interconnect trunk 427, as seen in FIG. 4. Bus control element (BC) 420 includes coherence command and data arbiters that manage intra-chip coherence and data communication through primary interconnect trunk 407 in concert with off-chip coherence and data communication through secondary trunk 427. Command arbiter/switch 220 of FIG. 2B and data arbiter 220A of FIG. 2F are an example of such command and data arbiters. Returning to FIG. 4, on-chip data and communication refers to coherence and data communications that are primarily or mainly on-chip, namely along primary interconnect trunk 407. However, the outer endpoints of primary trunk 407 may communicate with memory 110, 110' that may be off-chip and coupled to memory controllers (MC) 425 and 426 via memory buffer link driver/receivers 445 and 450, respectively.

SMP processor 400 uses secondary interconnect trunk 427 primarily or mainly for off-chip communications, namely communications with SMP processors on integrated circuit (IC) chips other than the chip of processor 400. Secondary trunk 427 includes nodal SMP link control element (NS) 435 and global SMP link control element 440. Nodal SMP link control element (NS) 435 and global SMP link control element 440 couple respectively to nodal SMP link drivers/receivers 455 and global SMP link drivers/receivers 460 to facilitate communication between processor 400 and other SMP processors off-chip with respect to processor 400.

Returning to FIG. 3E, and referring to the enlarged bus control element (BC) 420 shown in the upper left corner thereof, bus control element (BC) 420 includes an 1805 bit primary trunk interface on the left side of BC 420 and an 1805 bit primary trunk interface on the right side of BC 420. These primary trunk interfaces include a CMD TRUNK, SNOOP TRUNK, PRESP TRUNK, CRESP TRUNK and DATA TRUNK interfaces that in total exhibit a bit width of 1805 bits in this particular example. For convenience, FIG. 3E identifies these primary trunk interfaces via their bit widths, namely 1805 bits. The DATA TRUNK portions of the 1805 bit trunk interfaces on the left and right sides of BC 420 include 1280 bits that form eight (8) 16 byte data lanes, wherein each byte is 10 bits wide, as discussed in more detail below. Each data lane exhibits 160 bits in this particular example. BC 420 also includes a 970-bit secondary trunk interface at the top side of BC 420. This 970-bit secondary trunk interface at the top side of BC 420 includes SNOOP, PRESP, CRESP and DATA interfaces which together total 970 bits. BC 420 further includes a 1060 bit secondary trunk interface at the bottom side of BC 420. This 1060 bit secondary trunk interface at the bottom side of BC 420 includes BUS CMD, SNOOP, PRESP, CRESP and DATA interfaces which together total 1060 bits. These secondary trunk interfaces interface with secondary trunk 407.

The lower right portion of FIG. 3E shows a scaled-down version of bus control element (BC) 420 that exhibits the same spatial orientation as the enlarged bus control element (BC) 420 in the upper left of FIG. 3E. Bubbles with a number therein represent the bit widths of the primary and secondary trunk interconnects on each of the four sides of BC 420. More particularly, a bubble with 1805 therein represents the bit width of the primary trunk interconnect on the left side of BC 420 and another bubble with 1805 therein represents the bit width of the primary trunk interconnect on the right side of BC 420. The bubble with 970 therein represents the secondary trunk interconnect on the top side of BC 420. The bubble with 1060 therein represents the secondary trunk interconnect on the bottom side of BC 420.

As seen in FIG. 3E, the 1805 bit on-chip primary trunk interfaces manage coherence requests/grants from bus master elements and accept coherence commands, via CMD TRUNK. The 1805 bit on-chip primary trunk interfaces of BC 420 broadcast commands to all on-chip snoopers via SNOOP TRUNK, and accept PRESPs from all on-chip snoopers via PRESP TRUNK, and broadcast CRESPs to all on-chip bus masters and snoopers via CRESP TRUNK. Any of the elements of processor 400, that FIG. 2A-2G and FIG. 3A-3G depict, may be a bus master or snooper. The 1805 bit on-chip primary trunk interfaces of BC 420 also manage data requests/grants from all senders and transport data along primary trunk 407 using DATA TRUNK.

Figure 3F:
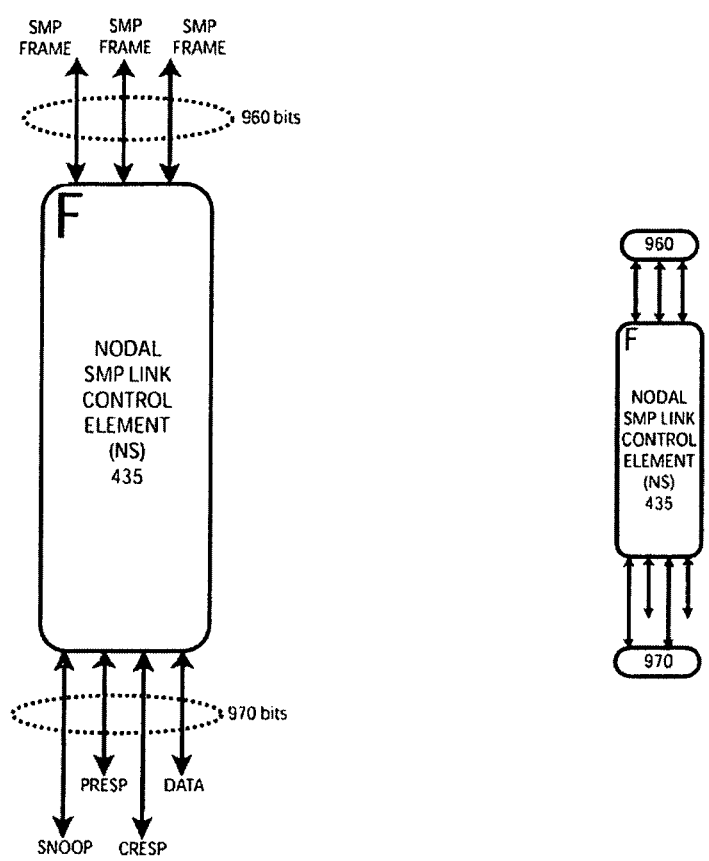
FIG. 3F shows a nodal SMP link control element in the processor of the disclosed IHS.

FIG. 3F shows an enlarged view of nodal SMP link control element (NS) that forms a portion of secondary trunk 427 between bus control element (BC) 420 and nodal SMP link drivers/receivers 455 of FIG. 4. On the right side of FIG. 3F is a scaled down version of NS 435 including bubbles to indicate the bit widths of the interfaces of NS 435. More particularly, NS 435 includes a 960-bit interface that includes three SMP FRAME interfaces on the top side thereof as seen in FIG. 3F. NS 435 also includes a 970 bit interface including SNOOP, PRESP, CRESP and DATA interfaces.

Figure 3G:
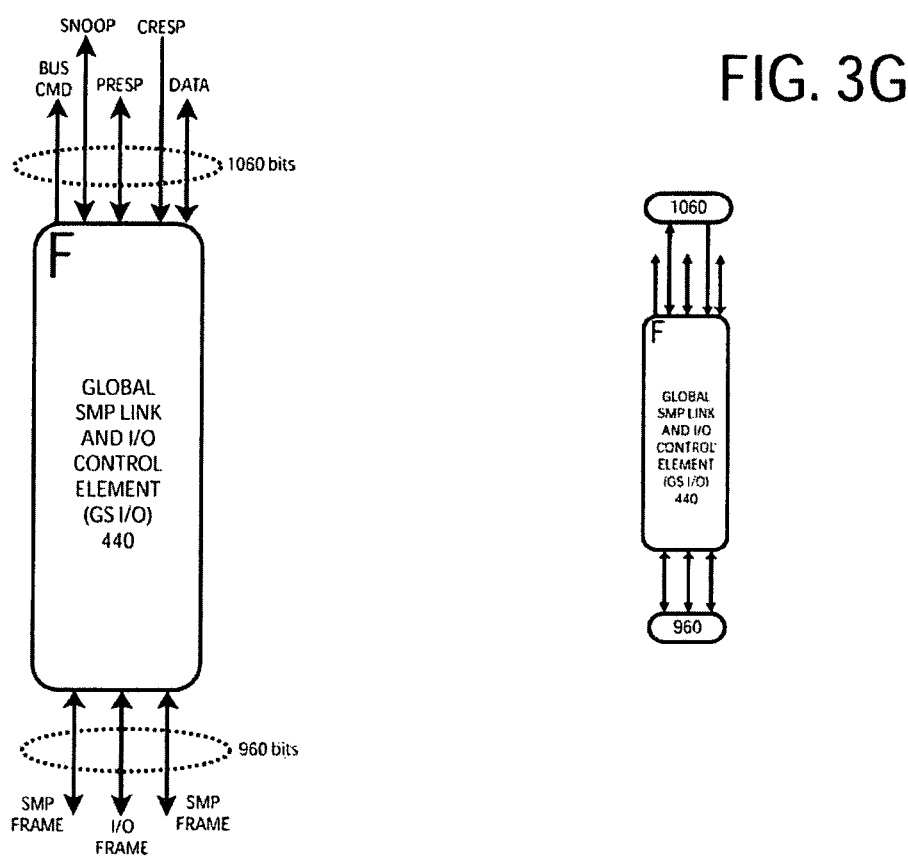
FIG. 3G shows a global SMP link and I/O control element in the processor of the disclosed IHS.

FIG. 3G shows an enlarged view of global SMP link and I/O control element (GS I/O) that forms a portion of secondary trunk 427 between bus control element (BC) 420 and global SMP link drivers/receivers 460 of FIG. 4. On the right side of FIG. 3G is a scaled down version of GS I/O 440 including bubbles to indicate the bit widths of the interfaces of GS I/O 440. More particularly, GS I/O 440 includes a 1060 bit interface that includes BUS CMD, SNOOP, PRESP, CRESP and DATA interfaces. GS I/O 440 also two SMP FRAME interfaces and an I/O FRAME interface as indicated by the bit width 960 at the bottom side of GS I/O 440 in FIG. 3G.

The nodal SMP link control element 435 (NS) of FIG. 3F and the global SMP link and I/O control element (GS I/O) 440 of FIG. 3G together form secondary interconnect trunk 427 of FIG. 4. The off-chip interfaces that NS 435 and GS I/O 440 provide, together with bus control element (BC) 420, manage outbound and inbound coherence commands via SNOOP, inbound and outbound partial responses via PRESP, outbound and inbound complete responses via CRESP and inbound and outbound data via DATA. The I/O control element of GS and I/O 440 provides master functionality in the portion of secondary trunk 427 between bus control element (BC) 420 and global SMP link drivers/receivers 460. The I/O control element of GS and I/O 440 requests and sends coherence commands via BUS CMD and employs the SNOOP, PRESP, CRESP and DATA interfaces of secondary interconnect trunk 427.

Nodal SMP link control element (NS) 435 couples to nodal SMP link drivers/receivers 455 which are adjacent perimeter 406 of processor die 405. Global SMP link and control element (GS I/O) 440 couples to global SMP link drivers/receivers 460 which are also adjacent perimeter 406. SMP drivers/receivers 455 and 460 facilitate off-chip communications with other SMP processors.

As discussed above, each bubble in processor 400 of FIG. 4 represents a bit width of a respective interface that FIGS. 3A-3G depict. In a summary of processor layout, the primary interconnect trunk 407 extends from a centralized bus control element (BC) 420 through the 1805 bit interface of trunk segment (TS) 421 (shown together with arrows), through trunk terminator (TT) 423 to memory control element (MC) 425. The primary interconnect trunk also extends from bus control element (BC) 420 through the 1805 bit interface of trunk segment (TS) 422, through trunk terminator (TT) 424 to memory control element (MC) 426. Memory control elements (MC) 425 and 426 couple to memory buffer link driver/receivers 445 and 450 at opposite sides 406A and 406B, respectively, adjacent perimeter 406 of die 405. Primary interconnect trunk 407 conducts primarily on-chip communications, for example communications from one compute element such as 300A to another compute element such as 300C. Primary interconnect trunk 407 also provides off-chip communications with memory such as memory 100 and memory 100'. The layout of processor 400 also includes a secondary interconnect trunk 427 that is substantially perpendicular to primary interconnect trunk 407, as shown in FIG. 4 for example. Secondary trunk 427 includes NS 435 that extends from bus control (BC) 420 to nodal SMP link drivers/receivers 455. Secondary trunk 427 also includes GS I/O 440 that extends from bus control (BC) 420 to global SMP link drivers/receivers 460. The layout of this particular embodiment of processor 400 locates drivers/receiver 455 and 460 at opposites sides 406C and 406D, respectively, adjacent perimeter 406 of die 405. Secondary interconnect trunk 427 conducts primarily off-chip communications, for example, communications with processors off-chip with respect to processor 400. The layout of this particular embodiment of processor 400 locates bus control element (BC) 420 at the intersection of substantially perpendicular primary interconnect trunk 407 and secondary interconnect trunk 427. Other embodiments may locate the intersection of the primary and secondary trunks, and/or the bus control element (BC) 420, at locations offset with respect to the center of processor 400. Primary interconnect trunk 407 and secondary interconnect trunk 427 intersect at bus controller (BC) 420 and exhibit a substantially perpendicular geometric relationship with respect to one another, as seen in FIG. 4. Primary interconnect trunk 407 and second interconnect trunk 427 thus divide processor 400 into 4 quadrants, namely QUADRANT 1, QUADRANT 2, QUADRANT 3 and QUADRANT 4. QUADRANT 1 includes a set of compute elements 300A, 300B. QUADRANT 2 includes a set of compute elements 300C, 300D. QUADRANT 3 also includes a set of compute elements 300A, 300B. QUADRANT 4 also includes a set of compute elements 300C, 300D.

In one embodiment, the layout distributes off-chip I/O interfaces, namely nodal SMP link drivers/receivers 455, along the perimeter 406 at processor side 406C. The layout may also distribute off-chip I/O interfaces, namely global SMP link drivers/receivers 460, along the perimeter 406 at processor side 406D. The layout also distributes off-chip interfaces, such as memory buffer link drivers/receivers 445 and memory buffer link drivers/receivers 450 along perimeter 406 at processor sides 406A and 406B, respectively.

Figure 5:
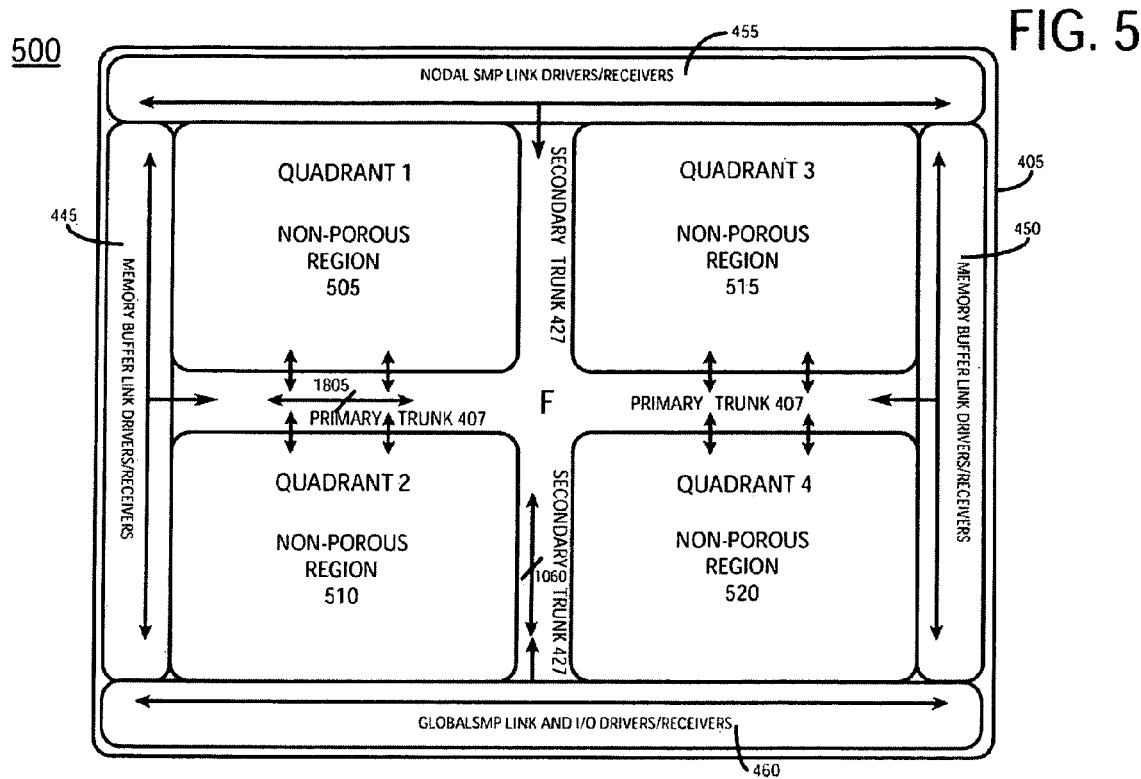
FIG. 5 shows the non-porous regions of the processor of the disclosed IHS.

FIG. 5 shows a high level representation of SMP processor 500 that summarizes worse-case aggregate wire interconnect counts that determine the dimensions of processor 500. In this particular example, processor 500 corresponds to processor 400 of FIG. 4 with like numbers indicating like elements. Processor 500 includes non-porous regions 505, 510, 515 and 520. Non-porous region 505 corresponds to compute elements 300A and 300B of processor 400 of FIG. 4. Non-porous region 510 corresponds to compute elements 300C and 300D of processor 400 of FIG. 4. Non-porous region 515 corresponds to compute elements 300A and 300B of processor 400 of FIG. 4. Non-porous region 520 corresponds to compute elements 300C and 300D of processor 400 of FIG. 4. Non-porous regions 505, 510, 515 and 520 also correspond to QUADRANT 1, QUADRANT 2, QUADRANT 3 and QUADRANT 4, respectively. In this particular example of FIG. 5, the bit width of primary trunk 407 is 1805 bits and the bit width of secondary trunk 427 is 1060 bits. These bit widths drive the dimensions of a particular processor. The bit widths recited herein are again for example purposes and should not be taking as limiting. The 1805 bit primary interconnect trunk of processor 500 of FIG. 5.

Figure 6A:
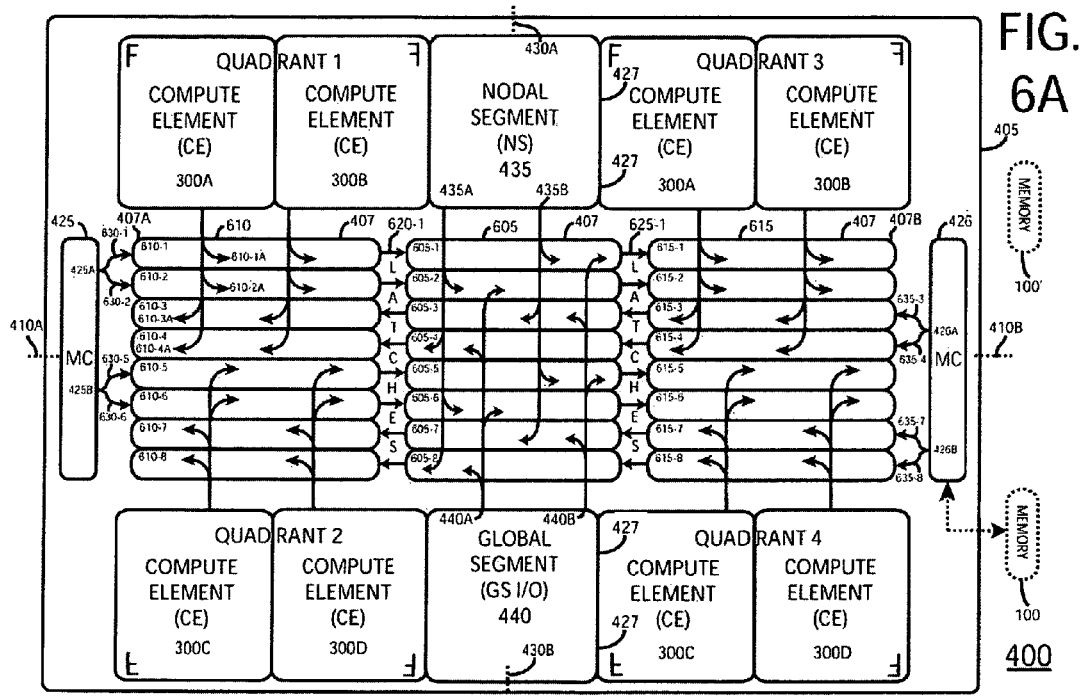
FIG. 6A shows an embodiment of the disclosed processor with emphasis on data on-ramps of the primary interconnect trunk.

FIG. 6A shows a representation of processor 400 with emphasis on the data trunk portion/data switch of primary interconnect trunk 407. FIG. 6A shows data on-ramps as discussed in more detail below. Primary interconnect trunk 407 extends along axis 410A-410B. Secondary interconnect trunk 427 extends along axis 430A-430B. FIG. 6A does not show the full primary interconnect trunk 407, but rather shows the data trunk portion/data switch thereof. FIG. 2B above shows a representation of this data switch as data switch 220 which controls the switching of data among compute elements, I/O control elements, SMP link control elements and memory controller elements.

Returning to FIG. 6A, nodal segment (NS) 435 and global segment (GS) 440 couple to central data switch segment 605 that includes 816 byte lane portions 605-1, 605-2, 605-3, 605-4, 605-5, 605-6, 605-7 and 605-8 wherein a byte is 10 bits. Processor 400 also includes a data switch segment 610 that couples the compute elements (CE) of QUADRANT 1 and the compute elements (CE) of QUADRANT 2 to the data trunk of primary interconnect trunk 407. Data switch segment 610 includes 816 byte lane portions 610-1, 610-2, 610-3, 610-4, 610-5, 610-6, 610-7 and 610-8 wherein a byte is 10 bits. Processor 400 further includes a data switch segment 615 that couples the compute elements (CE) of QUADRANT 3 and the compute elements (CE) of QUADRANT 4 to the data trunk of primary interconnect trunk 407. Data switch segment 615 includes 816 byte lane portions 615-1, 615-2, 615-3, 615-4, 615-5, 615-6, 615-7 and 615-8 wherein a byte is 10 bits.

Lane portions 610-1, 605-1 and 615-1 together form a data lane on which data may travel to and from compute elements and memory control elements on processor 400. Lane portions 610-2, 605-2 and 615-2 together form another data lane on which data may travel to and from compute elements and memory control elements on processor 400. Lane portions 610-3, 605-3 and 615-3 together form a data lane on which data may travel to and from compute elements and memory control elements on processor 400. Lane portions 610-4, 605-4 and 615-4 together form a data lane on which data may travel to and from compute elements and memory control elements on processor 400. Lane portions 610-5, 605-5 and 615-5 together form another data lane on which data may travel to and from compute elements and memory control elements on processor 400. Lane portions 610-6, 605-6 and 615-6 together form a data lane on which data may travel to and from compute elements and memory control elements on processor 400. Lane portions 610-7, 605-7 and 615-7 together form a data lane on which data may travel to and from compute elements and memory control elements on processor 400. Lane portions 610-8, 605-8 and 615-8 together form a data lane on which data may travel to and from compute elements and memory control elements on processor 400. Processor 400 may also employ these 8 data lanes for communications between on-chip compute elements and memory controllers and off-chip compute elements via nodal segment 435 and global segment 440 further via secondary interconnect trunk 427.

Figure 6B:
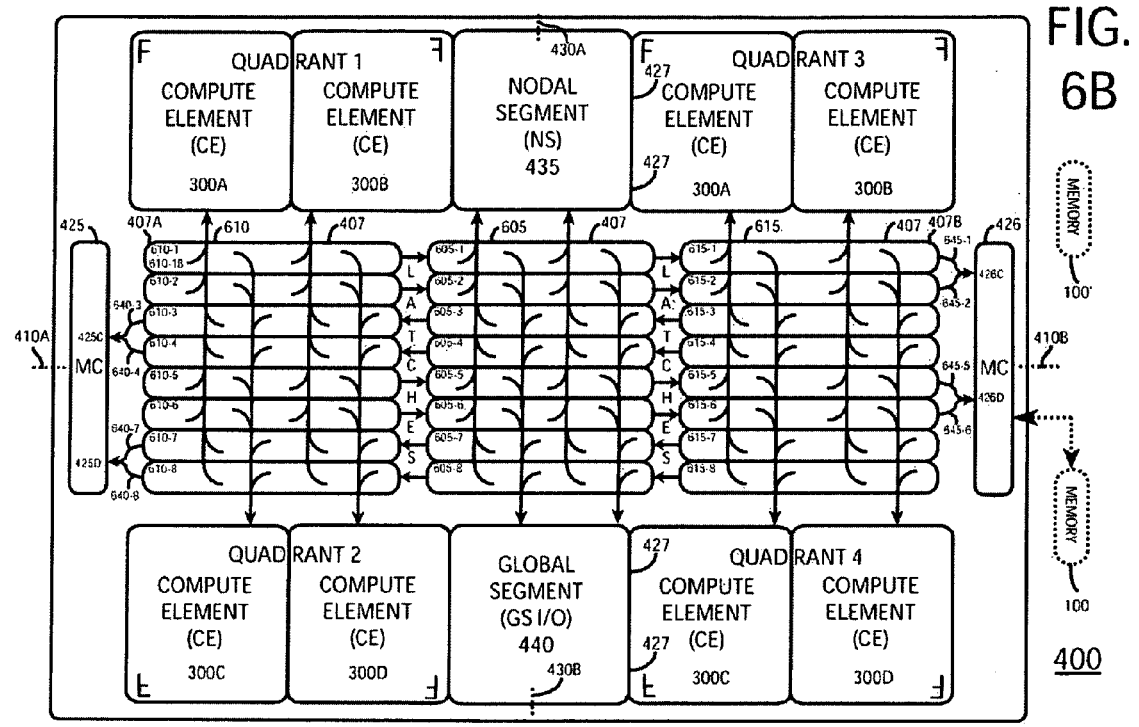
FIG. 6B shows an embodiment of the disclosed processor with emphasis on the data off-ramps of the primary interconnect trunk.

FIG. 6A shows the data lanes of processor 400 as including data on-ramps where data may enter a data lane. An arrowhead within a data lane, such as arrowhead 610-1A for example, indicates a data on-ramp or switch that allows data to enter that particular lane. To avoid crowding in FIG. 6A, FIG. 6A does not show data off-ramps. FIG. 6B shows data off-ramps where data may exit the data lanes. Returning to FIG. 6A, compute element 300A of QUADRANT 1 may use data on-ramp 610-1A to transmit data into the data lane that data lane portions 610-1, 605-1 and 615-1 form. The arrowhead of each data-on ramp indicates the direction of data flow, for example toward central data switch segment 605 or toward memory control element (MC) 425. Compute element 300A of QUADRANT 1 may access 4 data on-ramps in this embodiment, two of which may send data toward central data switch segment 605 and two of which may send data toward memory controller (MC) 425. More particularly, compute element 300A of QUADRANT 1 may use either of data on-ramps 610-1A, 610-2A to communicate data on a respective data lane toward central data switch segment 605. Compute element 300A of QUADRANT 1 may also use either of data on-ramps 610-3A, 6104A to send data in the opposite direction toward memory controller (MC) 425. Providing alternative data on-ramps and multiple accessible data lanes can may increase throughput and decrease latency within processor 400.

In this embodiment, the data on-ramps associated with the compute element 300A of QUADRANT 1 do not extend all the way across the lane portions 610-1, 610-2, . . . 610-8 of data switch segment 610, but rather extend across a portion thereof. For example, the data on-ramps extend across half of the data lane portions adjacent QUADRANT 1. The data on-ramps associated with compute element 300B of QUADRANT 1, namely those data-on ramps indicated by arrowheads coupled to that compute element 300B, extend across the same half of the data lane portions adjacent QUADRANT 1.

The data on-ramps, again indicated by arrowheads, associated with the compute element 300C of QUADRANT 2 do not extend all the way across the lane portions 610-1, 610-2, . . . 610-8 of data switch segment 610, but rather extend across a portion thereof. For example, these data on-ramps extend across half of the data lane portions adjacent QUADRANT 2 as shown in FIG. 6A. The data on-ramps associated with compute element 300D of QUADRANT 2, namely those data-on ramps indicated by arrowheads coupled to that compute element 300D, extend across the same half of the data lane portions adjacent QUADRANT 2. The data on-ramps, indicated by arrowheads, associated with compute elements 300A, 300B of QUADRANT 3 and compute elements 300C, 300D of QUADRANT 4 exhibit substantially the same topology as described above with respect to the data on-ramps for QUADRANT 1 and QUADRANT 2.

In one embodiment, the data on-ramps associated with nodal segment (NS) 435 extend substantially all the way across the lane portions of central data switch segment 605. As shown in FIG. 6A, nodal segment 435 includes a data port 435A that couples to alternating lane portions of central data switch segment 605, namely, namely lane portions 605-2, 605-4, 605-6 and 605-8 (indicated by arrowheads). Nodal segment 435 includes another data port 435B that couples to the remaining alternating lane portions of central data switch segment 605, namely lane portions 605-1, 605-3, 605-5 and 605-7.

In a manner similar to nodal segment (NS), the data on-ramps associated with global segment and I/O (GS I/O) 440, extend substantially all the way across the lane portions of central data switch 605. GS I/O 440 includes a data port 440A that couples to alternating lane portions of central data switch segment 605, namely lane portions 605-2, 605-4, 605-6 and 605-8 (indicated by arrowheads). GS I/O 440 includes another data port 440B that couples to the remaining alternating lane portions of central data switch segment 605, namely lane portions 605-1, 605-3, 605-5 and 605-7.

Each data lane portion of data switch segment 610 couples by a latch stage to a corresponding data lane portion of central data switch 605. For example, data latch stage 620-1, indicated by a right facing arrowhead, couples data lane portion 610-1 to data lane portion 605-1. The arrowhead of latch stage 620-1 indicates the direction of data flow. Latch stages such as latch stage 620-1 enable data to flow inward to and outward from central data switch segment 605 in a pipelined or clocked manner. Each data lane portion of data switch segment 615 couples by a latch stage to a corresponding data lane portion of central data switch 605. For example, data latch stage 625-1, indicated by a right facing arrowhead, couples data lane portion 615-1 to data lane portion 605-1. The arrowhead of latch stage 625-1 again indicates the direction of data flow. Latch stages such as latch stage 625-1 enable data to flow inward to and outward from central data switch segment 605 in a pipelined or clocked manner.

Memory controller 425 includes a data port 425A that couples via data on-ramps 630-1 and 630-2 to data lane portions 610-1 and 610-2, respectively, of data switch segment 610. Memory controller 425 also includes a data port 425B that couples via data on-ramps 630-5 and 630-6 to data lane portions 610-5 and 610-6, respectively, of data switch segment 610.

Memory controller 426 includes a data port 426A that couples via data on-ramps 635-3 and 635-4 to data lane portions 615-3 and 615-4, respectively, of data switch segment 615. Memory controller 426 also includes a data port 426B that couples via data on-ramps 635-7 and 635-8 to data lane portions 615-7 and 615-8, respectively, of data switch segment 615. Memory controller (MC) 426 couples to system memory 100, shown in dotted line. Memory controller (MC) 425 couples to system memory 100' (coupling not shown).

FIG. 6B shows the data lanes of processor 400 as including data off-ramps where data may exit a data lane. FIG. 6A employed arrowheads to indicate data on-ramps of the data lanes. In contrast, FIG. 6B employs arrowtails to indicate data off-ramps or exits from the data lanes. Arrowheads in FIG. 6B indicate the direction of data flow. Primary interconnect trunk 407 includes a data trunk portion that includes data switch segments 605, 610 and 615. Data lane portion 610-1 of data switch segment 610, data lane portion 605-1 of data switch segment 605 and data lane portion 615-1 of data switch segment 615 together form a data lane of the data trunk. Data lane portion 610-2 of data switch segment 610, data lane portion 605-2 of data switch segment 605 and data lane portion 615-2 of data switch segment 615 together form another data lane of the data trunk. The remaining data lane portions of the data switch segments form another 6 data lanes in a similar manner.

Arrowheads in FIG. 6B generally indicate the data flow into processor structures such as compute elements 300A, 300B, 300C and 300D, nodal segment (NS) 435, global segment (GS I/O) 440 and memory controllers (MC) 425, 426 from the data lanes of the data trunk portion of primary interconnect trunk 407. Arrowtails indicate off-ramps or exits from the data lanes of that data trunk. In this embodiment, compute element 300A of QUADRANT 1 couples to data off-ramps that extend substantially all the way across the data lane portions 610-1, 610-2, . . . 610-8 of switch segment 610. In other words, each data lane portion of data switch segment 610 includes a respective dedicated off-ramp as indicated by an arrowtail. For example, data lane portion 610-1 includes a data off-ramp 610-1B, as shown in FIG. 6B. Likewise, compute element 300B of QUADRANT 1 couples to data off-ramps that extend substantially all the way across the data lane portions 610-1, 610-2 . . . 610-8 of switch segment 610. In other words, each data lane portion of data switch segment 610 includes a respective dedicated off-ramp as indicated by an arrowtail. Compute elements 300C and 300D of QUADRANT 2 also couple to data off-ramps that extend substantially all the way across the data lane portions 610-1, 610-2, . . . 610-8 of switch segment 610. The compute elements of QUADRANT 3, the compute elements of QUADRANT 4, the nodal segment (NS) 435 and the global segment (GS I/O) 440 also couple to data off-ramps that extend substantially all the way across the data lane portions 610-1, 610-2, . . . 610-8 of switch segment 610.

Memory controller 425 includes a data port 425C that couples via data off-ramps 640-3 and 640-4 to data lane portions 610-3 and 610-4, respectively, of data switch segment 610. Memory controller 425 also includes a data port 425D that couples via data off-ramps 640-7 and 640-8 to data lane portions 610-7 and 610-8, respectively, of data switch segment 610.

Memory controller 426 includes a data port 426C that couples via data off-ramps 645-1 and 645-2 to data lane portions 615-1 and 615-2, respectively, of data switch segment 615. Memory controller 426 also includes a data port 426D that couples via data off-ramps 645-5 and 645-6 to data lane portions 615-5 and 615-6, respectively, of data switch segment 615.

In the embodiment of processor 400 depicted in FIG. 6A-6B, data switch segment 610 spans both the trunk segment (TS) of FIG. 3B and the trunk terminator (TT) of FIG. 3C. In doing so, data switch segment 610 couples the compute elements (CE) of QUADRANT 1 and QUADRANT 2 to the data trunk of primary interconnect trunk 407. Similarly, data switch segment 615 spans both another trunk segment (TS) of FIG. 3B and another trunk terminator (TT) of FIG. 3C in primary interconnect trunk 407. In doing so, data switch segment 615 couples the compute elements (CE) of QUADRANT 3 and QUADRANT 4 to the data trunk of primary interconnect trunk 407. The multiple on-ramps of FIG. 6A and multiple off-ramps of FIG. 6B may provide alternative data lanes when data lanes are busy communicating information. In one embodiment, the primary interconnect trunk 407 terminates at opposed ends 407A and 407B, as shown, and does not loop back on itself. Primary interconnect trunk 407 thus exhibits an open-ended on "non-ring" topology that may allow for up-stream data on-ramp tracking simplification.

Processor 400 may distribute and balance information flow or traffic flow across the multiple data lanes of primary interconnect trunk 407 consistent with the layout of data on-ramps and data off-ramps that FIG. 6A and FIG. 6B depict. If a blockage appears in a particular data lane, data may access an on-ramp or off-ramp of another data lane, depending on the traffic density of the data lanes of primary interconnect trunk 407.

Processor 400 exhibits three kinds of on-ramp/off-ramp connectivity, namely 1) compute element connectivity 2) nodal segment/global segment and I/O connectivity and 3) memory controller connectivity. With respect to compute element connectivity, one embodiment of processor 400 restricts data on-ramps to the 4 data lanes closest to a particular compute element as seen in FIG. 6A. However, processor 400 distributes the off-ramps for compute elements of FIG. 6B across substantially all of the data lanes of primary interconnect trunk 407. In other words, with respect to compute element connectivity, processor 400 restricts the on-ramps but does not restrict the off ramps in this particular embodiment.

With respect to nodal segment (NS) 435 connectivity, processor 400 distributes the on-ramps in alternating, staggered fashion across data switch segment 605, as show in FIG. 6A. With respect to nodal segment (NS) 435 connectivity, processor 400 distributes the off-ramps across substantially the entire 8 data lanes of primary interconnect trunk 407, as shown in FIG. 6B. Central data switch segment 605 provides centralized, balanced data on-ramp access so that NS 435 may source all data lanes of the data trunk of primary interconnect trunk 407 via multiple sets of data on-ramps shown in FIG. 6A.

With respect to global segment and I/O (GS I/O) 440 connectivity, processor 400 distributes the on-ramps in alternating, staggered fashion across data switch segment 605, as show in FIG. 6A. With respect to global segment and I/O (GS I/O) 440 connectivity, processor 400 distributes the off-ramps across the entire 8 data lanes of primary interconnect trunk 407, as shown in FIG. 6B. Central data switch segment 605 provides centralized, balanced data on-ramp access so that GS I/O 440 may source all data lanes of the data trunk of primary interconnect trunk 407 via the multiple sets of data on-ramps shown in FIG. 6A. With respect to memory controller (MC) 425 and 426 connectivity, processor 400 distributes the on-ramps as shown in FIG. 6A and distributes the off-ramps as shown in FIG. 6B. In FIG. 6A and 6B, memory controllers (MC) 425 and 426 couple to the opposed ends the data lanes formed by data switch segment 610, central data switch segment 605 and data switch segment 615. In the open-ended, non-ring primary interconnect trunk topology of processor 400, memory controller (MC) 425 acts as the initial source of data on data lanes directed away from memory controller (MC) 425. Memory controller (MC) 425 also acts as a sink for data of data lanes moving toward MC 425. Memory controller (MC) 426 acts as the initial source of data on data lanes directed away from memory controller (MC) 426. Memory controller (MC) 426 also acts as a sink for data of data lanes moving toward MC 426. The three unique data trunk attachment topologies disclosed herein, namely the compute element attachment topology, the nodal/global off-chip element attachment topologies, and the memory controller element attachment topology, may increase the throughput of the data trunk by employing alternative paths when a data lane exhibits a blockage. Availability of such an alternative path may depend on data trunk traffic volumes.

FIGS. 7A-7K illustrate representative data flows of processor 400. Some of these data flows are on-chip data flows and other data flows are off-chip data flows. For some of these data flows, processor 400 couples via its nodal segment (NS) 435 to a like nodal segment of a like processor 400' (not shown). More specifically, this off-chip coupling is via said SMP link control element (NS) 435 of FIG. 3F. Each chip, namely both processor 400 and processor 400', includes such an nodal SMP link control element 435 to facilitate processor to processor, or chip to chip, data communication.

Figure 7A:
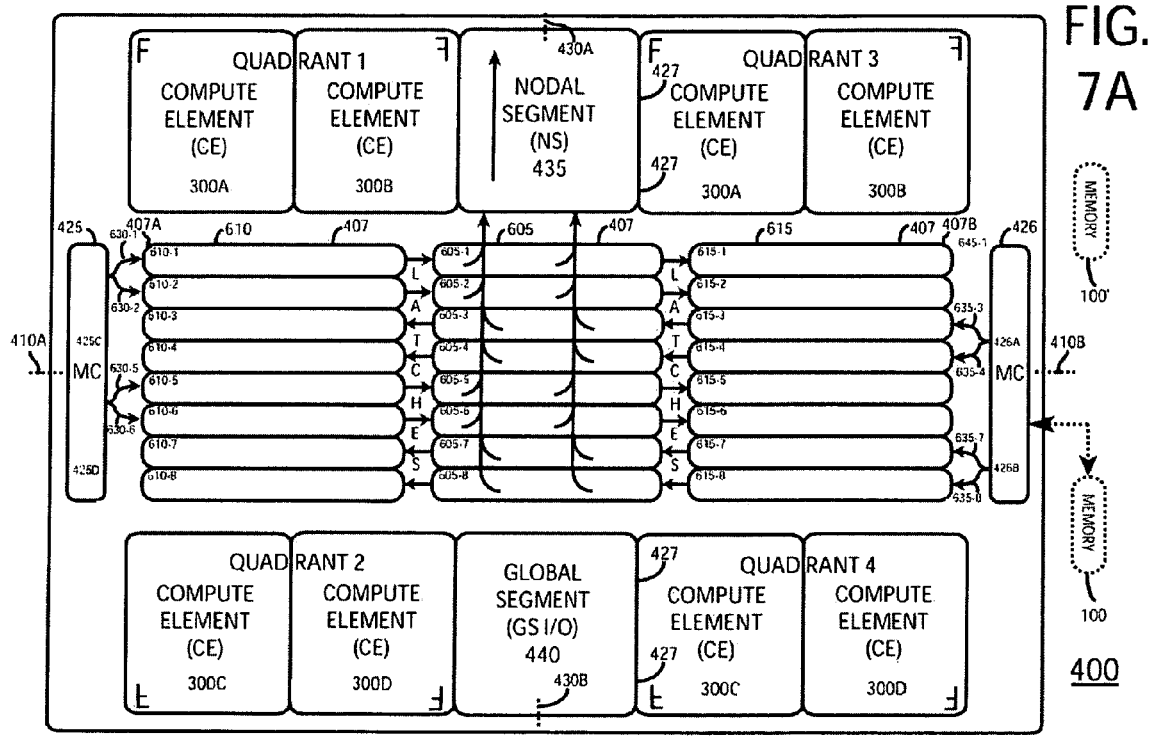
FIG. 7A-7F shows representative data flows among the components of the disclosed processor.
Figure 7B:
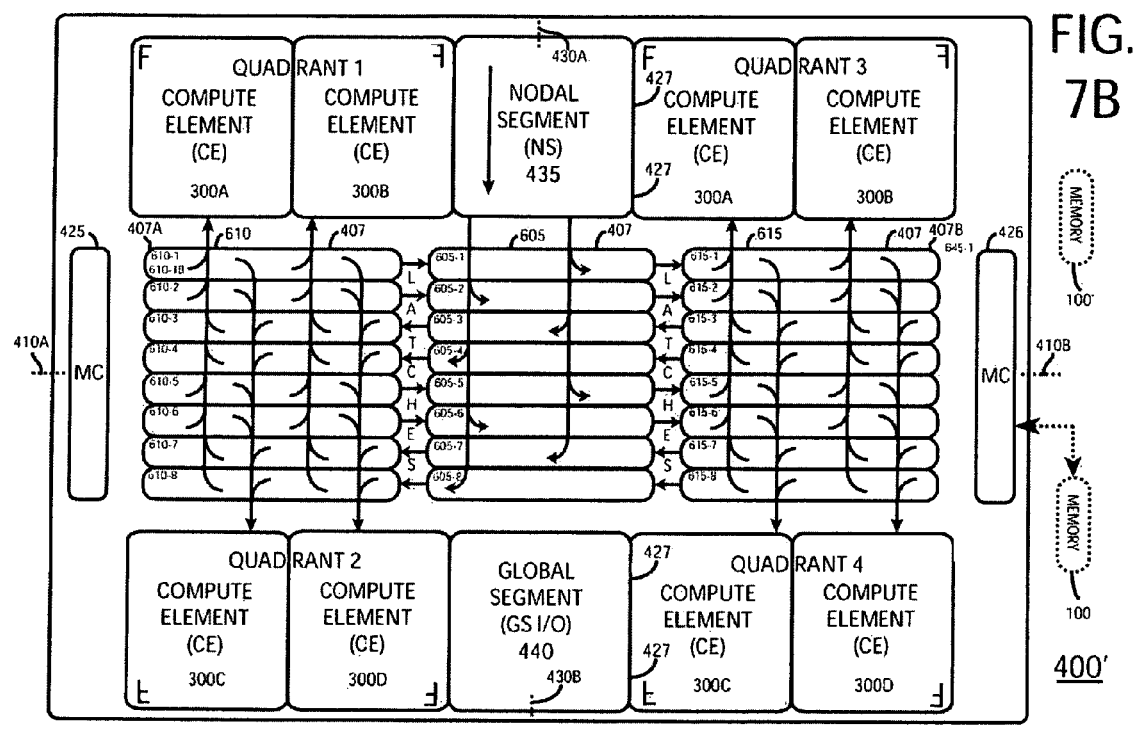

FIGS. 7A and 7B together illustrate the transfer of data from a memory of one processor to the compute elements of another processor. More particularly, FIG. 7A shows a representative data flow between a memory 100 and memory controller 426 that feeds a nodal SMP link 435. This data flow enables another processor 400' (not shown in FIG. 7A) to access the memory 100 of processor 400. This view emphasizes the memory controller to nodal SMP link data flow by removing on-ramps and off-ramps not directly involved in the data flow. FIG. 7B shows a data flow in which another processor 400' receives data from the processor 400. Processor 400' receives data via nodal segment 435 of FIG. 7B and may distribute the data among the compute elements by way of the many paths indicated by the data lane on-ramps and data lane off-ramps of primary interconnect trunk 407.

Figure 7C:
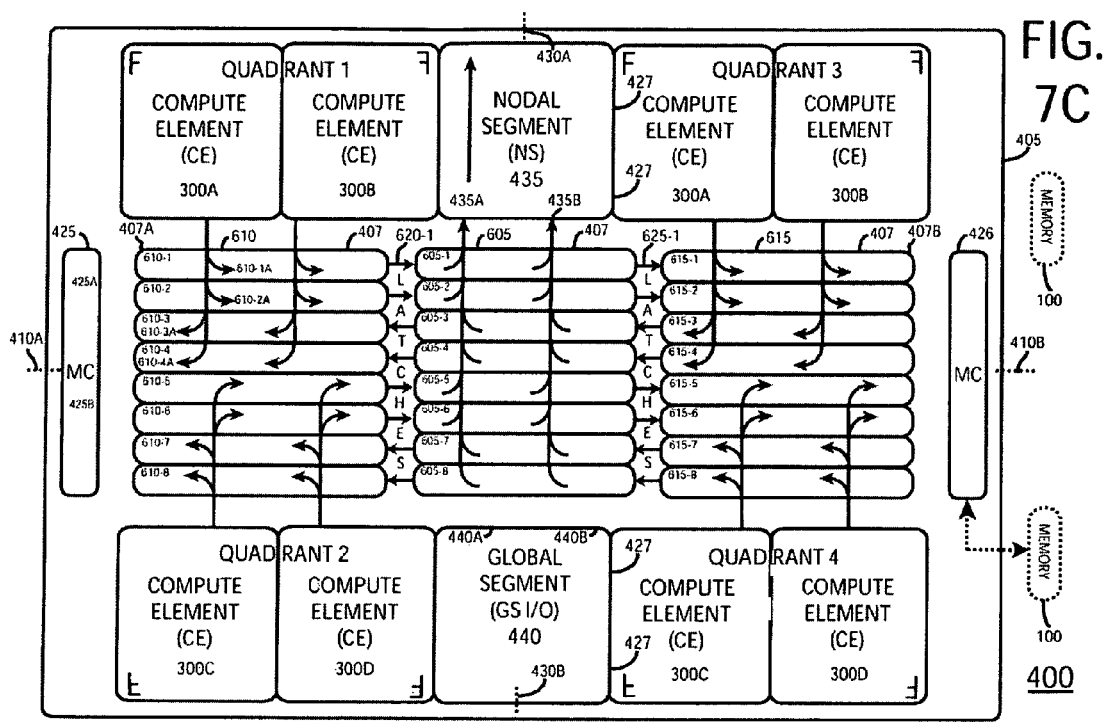
Figure 7D:
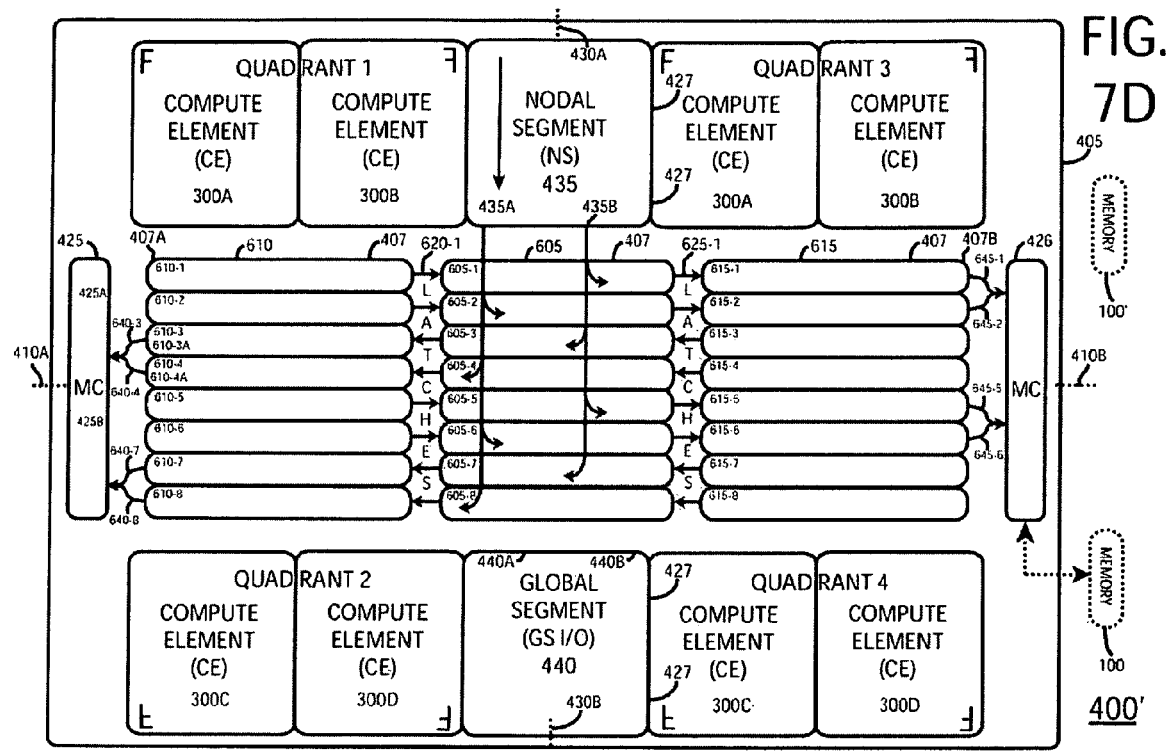

FIGS. 7C and 7D together illustrate the transfer of data from a compute element of one processor 400 to the memory of another processor 400'. More particularly, FIG. 7C shows representative data flow from compute elements (CE) to nodal segment 435 of processor 400 in preparation for communicating the data off-chip to processor 400' of FIG. 7D. FIG. 7D shows a representative data flow wherein nodal segment (NS) 435 of processor 400' receives off-chip data and distributes the data to memory via either memory controller (MC) 425 or memory controller (MC) 426.

Figure 7E:
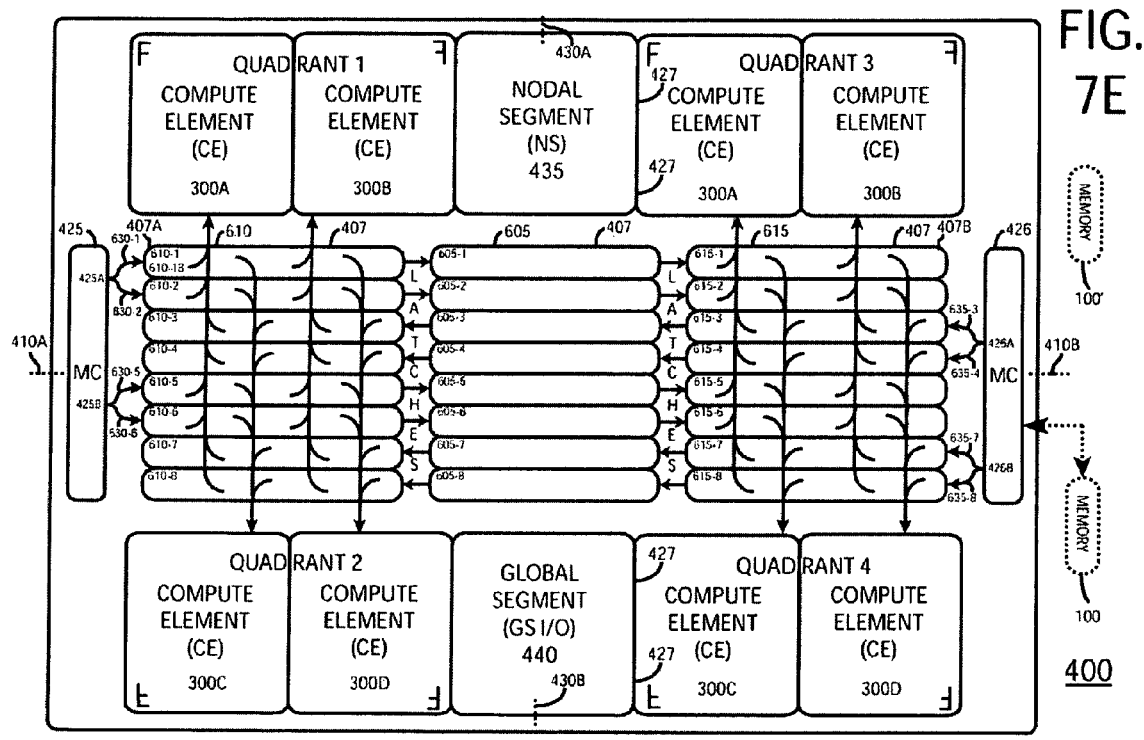
Figure 7F:
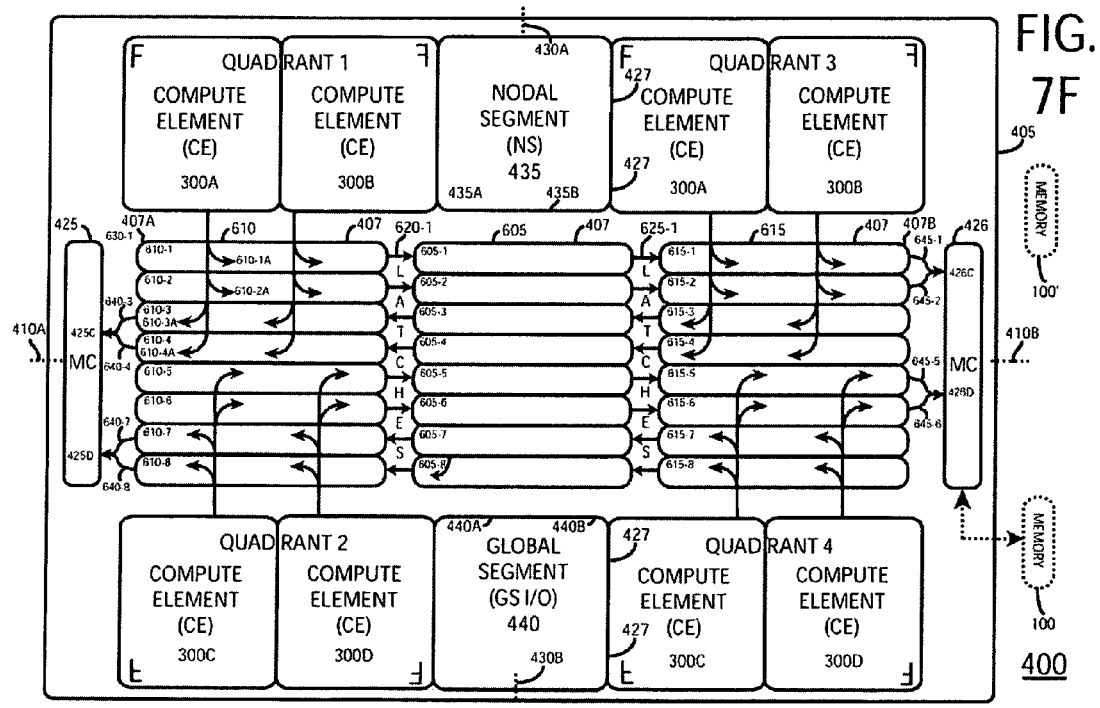

FIG. 7E shows on-chip data flow from memory controllers (MC) 425 and 426 to the compute elements (CE). In this manner, data flows from memory 100 or memory 100' to any of compute elements (CE) of QUADRANT 1, QUADRANT 2, QUANDRANT 3 and QUADRANT 4. FIG. 7F shows on-chip data flow from compute elements (CE) to memory controllers (MC) 425 and 426. In this manner, data flows from any of compute elements (CE) of QUADRANT 1, QUADRANT 2, QUANDRANT 3 and QUADRANT 4 to memory 100 or memory 100'.

Figure 8:
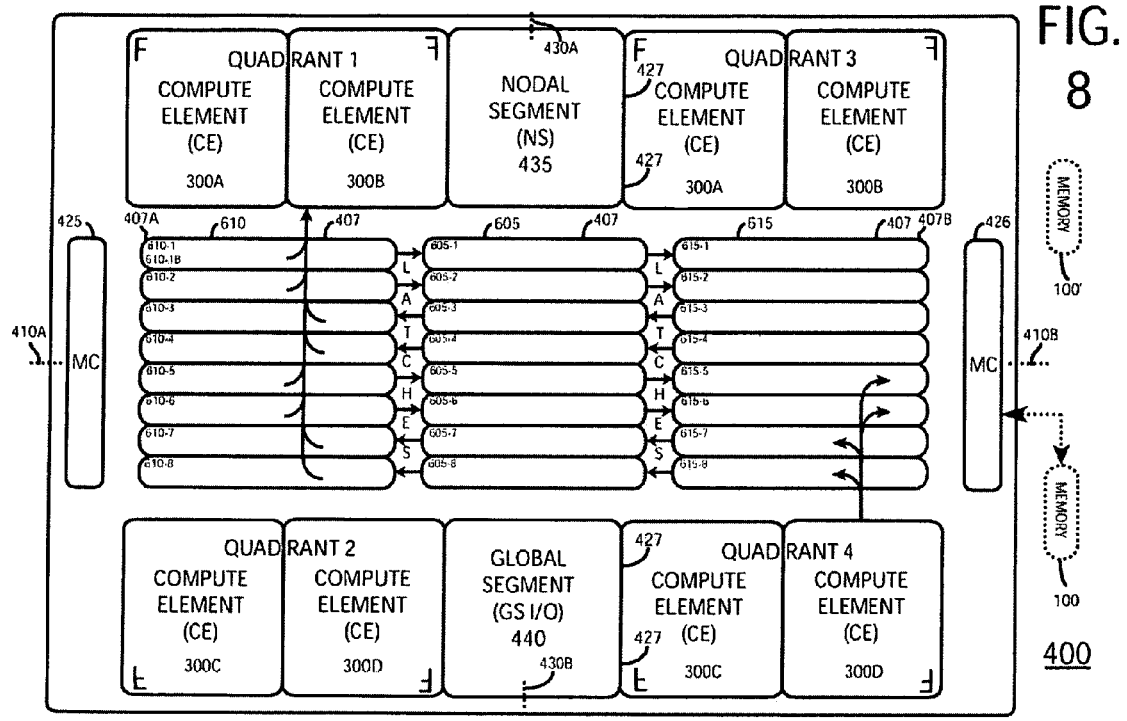
FIG. 8 shows another representative data flow among the components of the disclosed processor.

FIG. 8 shows representative data flow from one compute element (CE) 300D of QUADRANT 4 to compute element (CE) 300B of QUADRANT 1.

Figure 9A:
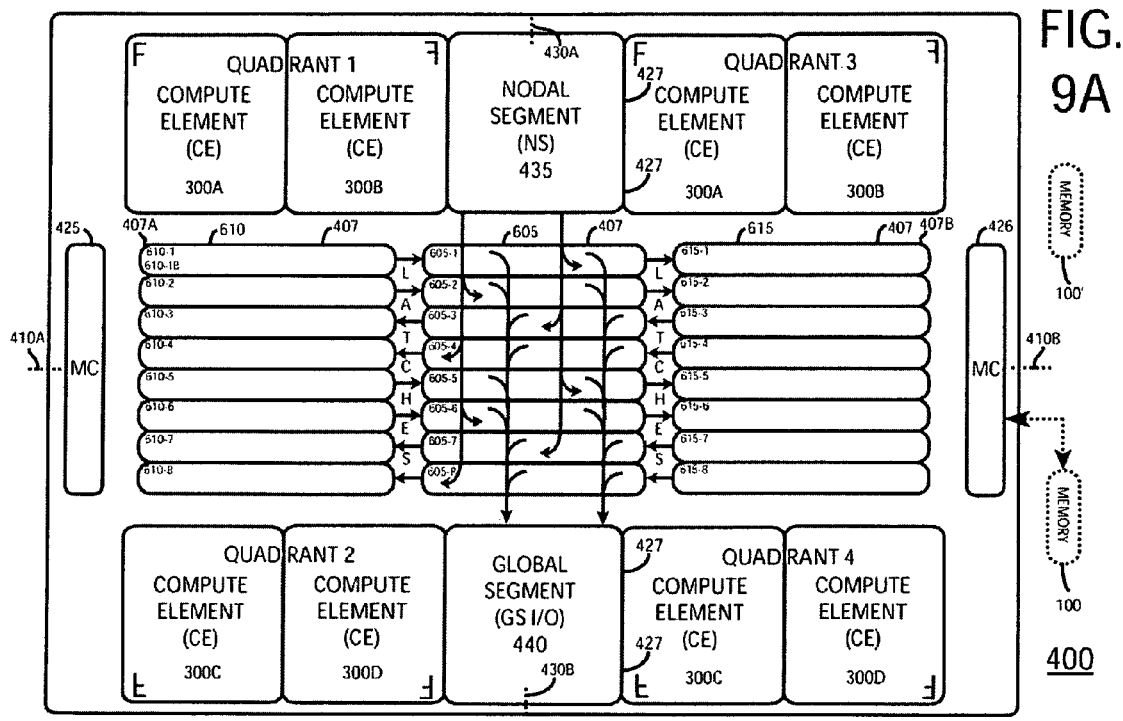
FIG. 9A-9E show still other representative data flows among the components of the disclosed processor.
Figure 9B:
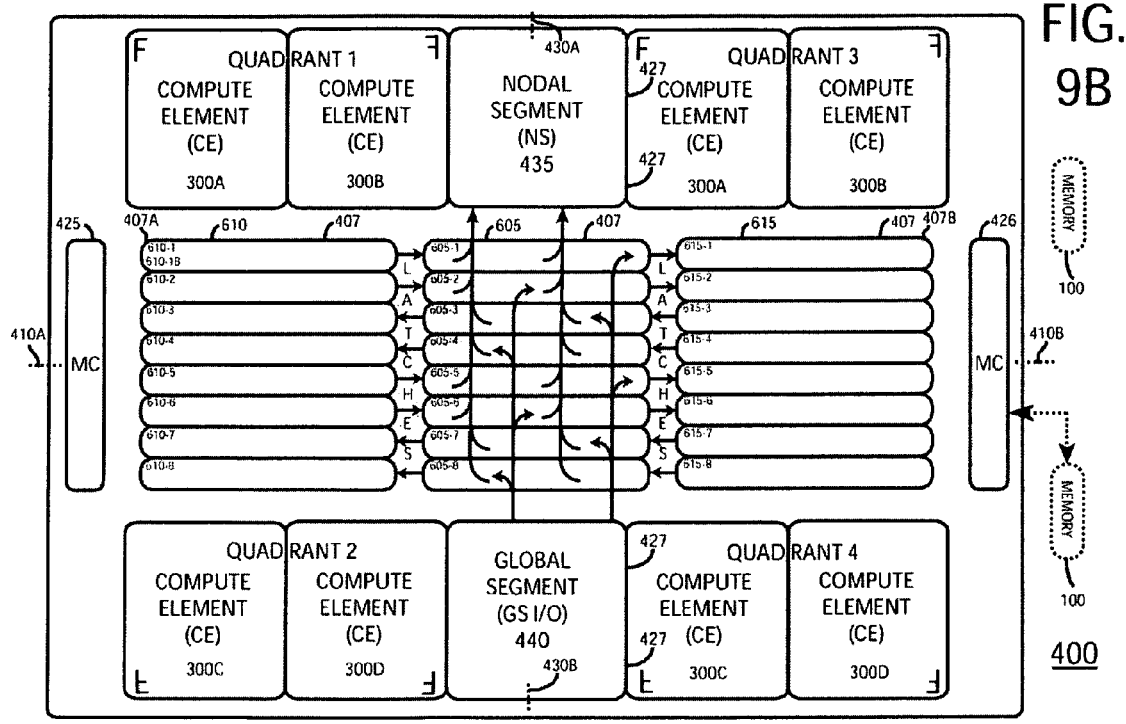

FIG. 9A shows representative data flow from the nodal segment (NS) 435 to global segment and I/O (GS I/O) 440 via central data switch segment 605. FIG. 9B shows representative data flow in a direction opposite that of FIG. 9A, namely from the global segment and I/O (GS I/O) 440 to nodal segment (NS) 435 via central data switch segment 605.

Figure 9C:
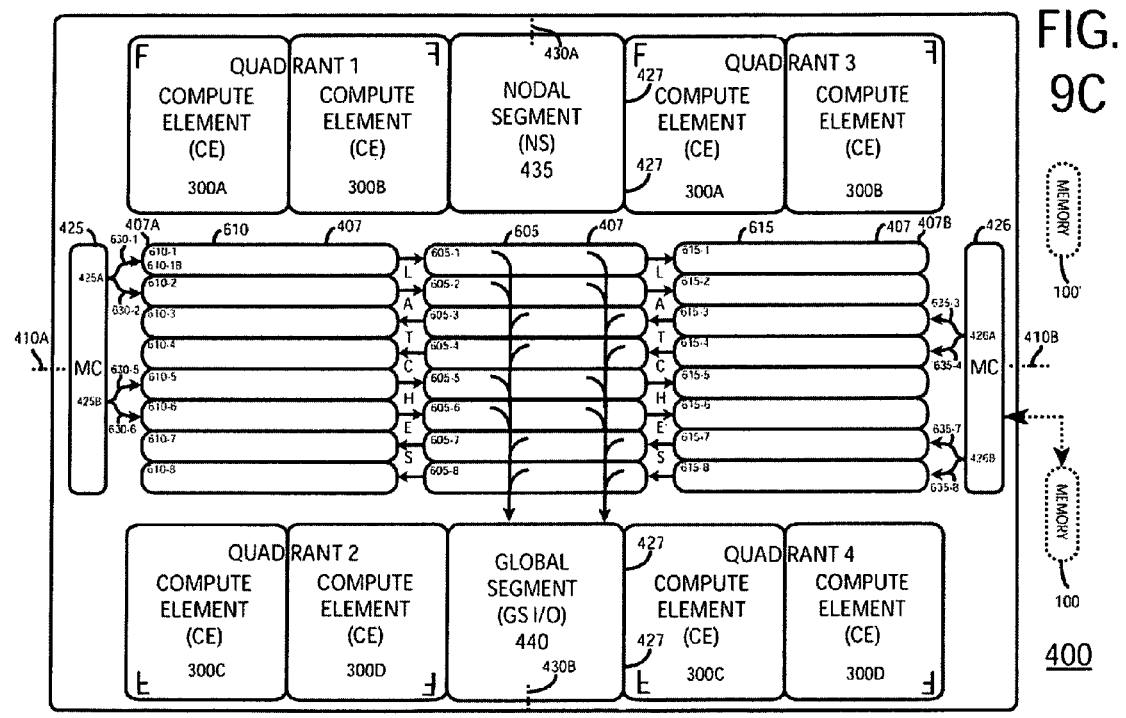
Figure 9D:
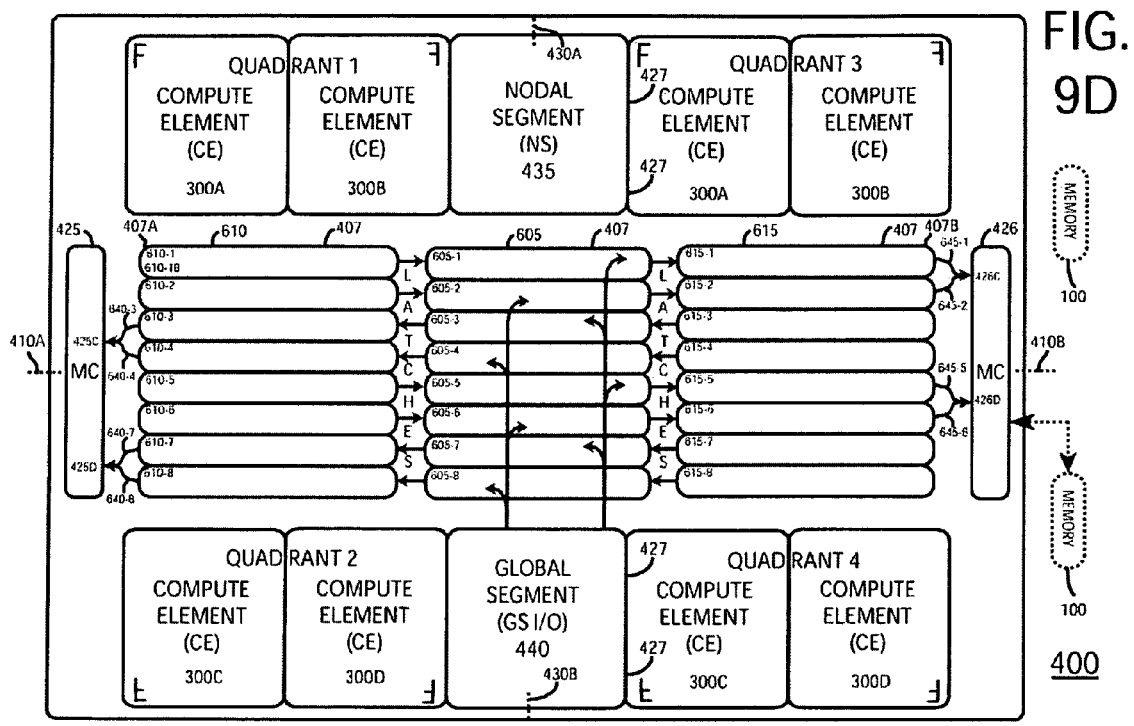
Figure 9E:
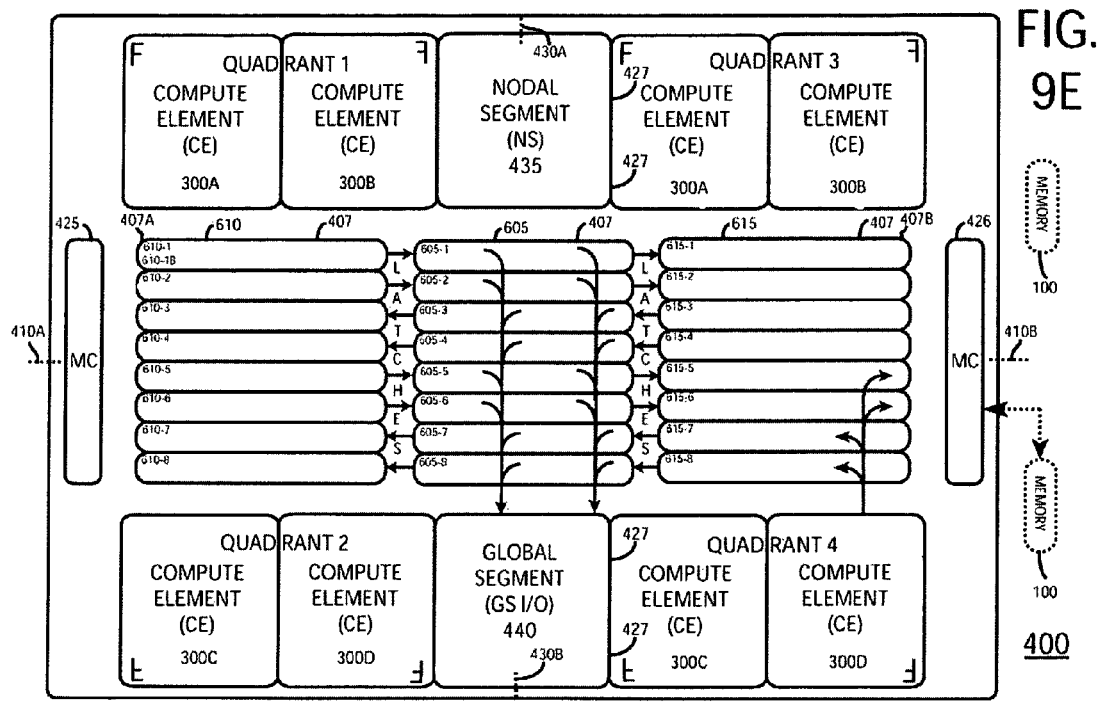

FIG. 9C shows representative data flow from memory controllers 425, 426 to global segment and I/O (GS I/O) 440 via central data switch segment 605. FIG. 9D shows representative data flow in a direction opposite that of FIG. 9B, namely from the global segment and I/O (GS I/O) 440 to memory controllers 425, 426 via central data switch segment 605. FIG. 9E shows representative data flow from a compute element such as compute element 300D of QUADRANT 4 to global segment and I/O (GS I/O) 440 via data switch segment 615 and central data switch segment 605.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. For example, in an alternative embodiment, the processor may not employ secondary interconnect trunk connectivity and nodal/global segment connectivity. The particular embodiment shown was chosen and described in order to best explain the principles of the invention and the practical application, and to enable others of ordinary skill in the art to understand the invention for various embodiments with various modifications as are suited to the particular use contemplated.

What is claimed is:

1. A processor comprising:
   a substrate including a perimeter;
   a primary interconnect trunk situated along a first axis of the substrate, the primary interconnect trunk including first and second opposed ends, the primary interconnect trunk including a data trunk;
   a secondary interconnect trunk situated along a second axis of the substrate, the first axis intersecting the second axis such that the primary and secondary interconnect trunks divide the processor into first, second, third and fourth quadrants, the secondary interconnect trunk including first and second opposed ends; and
   a plurality of compute elements being situated in each of the first, second, third and fourth quadrants along the primary interconnect trunk, wherein each of the compute elements couples directly to the primary interconnect trunk;
   the compute elements of the first quadrant being switchably coupled to the data trunk via a first plurality of data on-ramps that extend across a portion of the data trunk but not fully across the data trunk;
   the compute elements of the second quadrant being switchably coupled to the data trunk via a second plurality of data on-ramps that extend across a portion of the data trunk but not fully across the data trunk;
   the compute elements of the third quadrant being switchably coupled to the data trunk via a third plurality of data on-ramps that extend across a portion of the data trunk but not fully across the data trunk;
   the compute elements of the fourth quadrant being switchably coupled to the data trunk via a fourth plurality of data on-ramps that extend across a portion of the data trunk but not fully across the data trunk;
   the compute elements of the first, second, third and fourth quadrants being switchably coupled to the data trunk via a plurality of data off-ramps that extend fully across the data trunk.

2. The processor of claim 1, wherein the portion of the data trunk is half of the data trunk.

3. The processor of claim 1, wherein the first and second opposed ends of the primary interconnect trunk form respective first and second terminations of the data trunk.

4. The processor of claim 3, further comprising first and second memory controllers coupled to the respective first and second terminations of the data trunk of the primary interconnect trunk.

5. The processor of claim 3, further comprising a first data switch segment situated on the substrate where the first and second axes intersect, the first data switch segment including first and second opposed sides.

6. The processor of claim 5, further comprising second and third data switch segments facing the first and second opposed sides of the first data switch segment along the primary interconnect trunk.

7. The processor of claim 6, wherein the first, second and third data switch segments are pipelined.

8. The processor of claim 6, wherein the first, second and third data switch segments form data lanes of the data trunk of the primary interconnect trunk.

9. An information handling system (IHS), comprising:
   a first memory;
   a processor, coupled to the first memory, the processor including:
      a substrate including a perimeter;
      a primary interconnect trunk situated along a first axis of the substrate, the primary interconnect trunk including first and second opposed ends, the primary interconnect trunk including a data trunk;
      a secondary interconnect trunk situated along a second axis of the substrate, the first axis intersecting the second axis such that the primary and secondary interconnect trunks divide the processor into first, second, third and fourth quadrants, the secondary interconnect trunk including first and second opposed ends; and
      a plurality of compute elements being situated in each of the first, second, third and fourth quadrants along the primary interconnect trunk, wherein each of the compute elements couples directly to the primary interconnect trunk;
      the compute elements of the first quadrant being switchably coupled to the data trunk via a first plurality of data on-ramps that extend across a portion of the data trunk but not fully across the data trunk;
      the compute elements of the second quadrant being switchably coupled to the data trunk via a second plurality of data on-ramps that extend across a portion of the data trunk but not fully across the data trunk;
      the compute elements of the third quadrant being switchably coupled to the data trunk via a third plurality of data on-ramps that extend across a portion of the data trunk but not fully across the data trunk;
      the compute elements of the fourth quadrant being switchably coupled to the data trunk via a fourth plurality of data on-ramps that extend across a portion of the data trunk but not fully across the data trunk;
      the compute elements of the first, second, third and fourth quadrants being switchably coupled to the data trunk via a plurality of data off-ramps that extend fully across the data trunk.

10. The IHS of claim 9, wherein the portion of the data trunk is half of the data trunk.

11. The IHS of claim 9, wherein the first and second opposed ends of the primary interconnect trunk form respective first and second terminations of the data trunk.

12. The IHS of claim 11, further comprising first and second memory controllers coupled to the respective first and second terminations of the data trunk of the primary interconnect trunk.

13. The IHS of claim 11, further comprising a first data switch segment situated on the substrate where the first and second axes intersect, the first data switch segment including first and second opposed sides.

14. The IHS of claim 13, further comprising second and third data switch segments facing the first and second opposed sides of the first data switch segment along the primary interconnect trunk.

15. The IHS of claim 14, wherein the first, second and third data switch segments are pipelined.

16. The IHS of claim 14, wherein the first, second and third data switch segments form data lanes of the data trunk of the primary interconnect trunk.

17. A method comprising,
providing a plurality of compute elements located adjacent a primary interconnect trunk situated on a first axis of a substrate, the primary interconnect trunk including a data trunk with first and second ends, wherein each of the compute elements couples directly to the primary interconnect trunk;
providing a secondary interconnect trunk on a second axis of the substrate, the first axis intersecting the second axis such that the primary and secondary interconnect trunks divide the compute elements into first, second, third and fourth quadrants on the substrate;
switchable coupling the compute elements of the first quadrant coupled to the data trunk via a first plurality of data on-ramps that extend across a portion of the data trunk but not fully across the data trunk;
switchable coupling the compute elements of the second quadrant coupled to the data trunk via a second plurality of data on-ramps that extend across a portion of the data trunk but not fully across the data trunk;
switchable coupling the compute elements of the third quadrant coupled to the data trunk via a third plurality of data on-ramps that extend across a portion of the data trunk but not fully across the data trunk;
switchable coupling the compute elements of the fourth quadrant coupled to the data trunk via a fourth plurality of data on-ramps that extend across a portion of the data trunk but not fully across the data trunk; and
switchably coupling the compute elements of the first, second, third and fourth quadrants to the data trunk via a plurality of data off-ramps that extend fully across the data trunk.

18. The method of claim 17, wherein the portion of the data trunk is half of the data trunk.

19. The method of claim 17, further comprising forming data trunk terminations at respective opposed ends of the primary interconnect trunk.

20. The method of claim 17, further comprising providing data lanes to the data trunk of the primary interconnect trunk, wherein first, second and third data switch segments form the data lanes of the data trunk of the primary interconnect trunk, the first data switch segment being formed at an intersection of the primary interconnect trunk and the secondary interconnect trunk, the second and third data switch segments communicating with the plurality of compute elements.

* * * * *